United States Patent [19]

Meyers et al.

[11] Patent Number: 5,408,212
[45] Date of Patent: Apr. 18, 1995

[54] MULTI-MODE COMBINATION ALARM AND LOCKING APPARATUS FOR BICYCLES, MOTORCYCLES AND THE LIKE

[75] Inventors: Chip E. R. Meyers, Santa Monica; Frederick W. Schmidt, Redondo Beach; Mark Andersen, Woodland Hills, all of Calif.

[73] Assignee: Brio Corporation, Santa Monica, Calif.

[21] Appl. No.: 946,844

[22] Filed: Sep. 18, 1992

[51] Int. Cl.$^6$ ................................................ B62J 3/00
[52] U.S. Cl. ................................. 340/427; 340/426; 340/432; 70/39; 70/233
[58] Field of Search ............... 340/426, 427, 432; 70/18, 30, 38, 39, 49, 233

[56] References Cited

U.S. PATENT DOCUMENTS

| | | | |
|---|---|---|---|
| 3,755,778 | 8/1973 | Kennedy et al. | 340/427 |
| 3,772,645 | 11/1973 | Odenz et al. | 340/571 |
| 3,824,540 | 7/1974 | Smith, II | 340/427 |
| 3,906,758 | 9/1975 | Hurwitt | 70/30 |
| 4,379,281 | 4/1983 | Thomas | 340/427 |
| 4,663,611 | 5/1987 | Humphrey | 340/542 |
| 4,746,909 | 5/1988 | Israel et al. | 340/568 |
| 4,755,806 | 7/1988 | Villarreal | 340/689 |
| 4,776,188 | 12/1988 | Dalabe et al. | 70/49 |
| 4,811,578 | 3/1989 | Masoncap et al. | 340/542 |
| 4,833,456 | 5/1989 | Heller | 340/571 |
| 4,896,517 | 1/1990 | Ling | 70/18 |
| 4,968,973 | 11/1990 | Rowland | 340/571 |
| 4,992,789 | 2/1991 | Czerwinski | 340/984 |
| 5,023,596 | 6/1991 | Sirman et al. | 340/571 |
| 5,127,562 | 7/1992 | Zane et al. | 224/39 |
| 5,194,845 | 3/1993 | Sirmon et al. | 340/427 |

*Primary Examiner*—John K. Peng
*Assistant Examiner*—Edward Lefkovitz
*Attorney, Agent, or Firm*—Thomas I. Rozsa; Tony D. Chen

[57] ABSTRACT

The present invention is a multi-mode combination alarm and locking apparatus for bicycles, motorcycles and the like. The case of the combination alarm and locking apparatus can be attached to a bicycle or the like by a hollow bracket which can detachably mounted to a tubular section of the bicycle frame. In the preferred embodiment the combination alarm and locking apparatus includes a U-bolt lock. In an alternative embodiment the combination alarm and locking apparatus can be used in conjunction with a U-bolt lock. The combination alarm and locking apparatus also has a cable lock which has an elongated flexible cable with a conductive core and is retained by a retractable spool. The spool is releasibly engaged with a releasible rachet mechanism which controls the retraction of the spool. The combination alarm and locking apparatus further provides a multi-mode alarm protection to the bicycle, including the motion detection, the battery compartment door tampering detection and the cable lock continuity detection, all operable with a single key.

60 Claims, 7 Drawing Sheets

MULTI-MODE COMBINATION ALARM AND LOCKING APPARATUS FOR BICYCLES, MOTORCYCLES AND THE LIKE

BACKGROUND OF THE INVENTION

1. Field of The Invention

The present invention relates generally to electronic alarm apparatus and mechanical lock apparatus. More particularly, the present invention relates to a multi-mode combination alarm and locking apparatus for bicycles, motorcycles and the like.

2. Description of The Prior Art

Various locking apparatus, some of which include alarms for bicycles, motorcycles and the like or other equipment have been disclosed by the following prior art references.

1. U.S. Pat. No. 3,755,778 issued to Kennedy et al. on Aug. 28, 1973 for "Cycle Burglar Alarm" (hereafter the "Kennedy Patent").

2. U.S. Pat. No. 3,772,645 issued to Odenz et al. on Nov. 3, 1973 for "Vehicle Alarm System" (hereafter the "Odenz Patent").

3. U.S. Pat. No. 3,824,540 issued to Smith, II on Jul. 16, 1974 for "Bicycle Lock And Alarm Apparatus" (hereafter the "Smith Patent").

4. U.S. Pat. No. 4,379,281 issued to Thomas on Apr. 5, 1983 for "Alarm System For Bicycles And The Like" (hereafter the "Thomas Patent").

5. U.S. Pat. No. 4,663,611 issued to Humphrey on May 5, 1987 for "Alarm Lock" (hereafter the "Humphrey Patent").

6. U.S. Pat. No. 4,746,909 issued to Israel et al. on May 24, 1988 for "Modular Security System" (hereafter the "Israel Patent").

7. U.S. Pat. No. 4,755,806 issued to Villarreal on Jul. 5, 1988 for "Movement Sensor" (hereafter the "Villarreal Patent").

8. U.S. Pat. No. 4,833,456 issued to Heller on May 23, 1989 for "Ski Security Device" (hereafter the "Heller Patent").

9. U.S. Pat. No. 4,968,973 issued to Rowland on Nov. 6, 1990 for "Anti-Theft Device" (hereafter the "Rowland Patent").

10. U.S. Pat. No. 4,992,789 issued to Czerwinski on Feb. 12, 1991 for "Marine Lock And Alarm Apparatus" (hereafter the "Czerwinski Patent").

11. U.S. Pat. No. 5,023,596 issued to Sirman et al. on Jun. 11, 1991 for "Bicycle Alarm" (hereafter the "Sirman Patent").

The Kennedy Patent discloses an early bicycle alarm apparatus. The Kennedy Patent apparatus comprises a case, which may be mounted to the frame of a bicycle by a pair of clamps. The case houses an alarm circuitry and a retractable cable. The alarm circuitry includes a mercury motion switch MS for detecting the unauthorized movement of the bicycle. The alarm circuitry also includes a tamper motion switch TS for detecting the unauthorized removal of the case from the frame of the bicycle. The alarm circuitry further includes a cable shield for activating the alarm if the cable is cut. The alarm apparatus can be operated by a key switch KS. The Kennedy Patent discloses many features of a combined coil lock and alarm apparatus. However, it does not have any means for accommodating a U-bolt lock. In addition, the case is permanently mounted to the frame of the bicycle by external clamps.

The Odenz Patent also discloses an early bicycle alarm apparatus. The Odenz Patent apparatus comprises a case, which may be mounted to a vertical post of a bicycle. The case can be opened to permit the vertical post to be passed through it. An internal clamp is provided for fastening the case to the vertical post. The case houses an alarm circuitry which includes a gimbaled motion switch for detecting the unauthorized movement of the bicycle. The Odenz Patent apparatus also comprises a locking chain which has one end fixedly attached to the case, and another end detachably attached to the case. The locking chain has inner electrical wires which are connected to the alarm circuitry for activating the alarm if the locking chain is cut. The disadvantage of the Odenz Patent is that the locking chain is not retained in the case when it is not used, and every time the locking chain is locked or unlocked, the user has to open the case. There is also no means for adapting a U-bolt lock.

The Smith Patent discloses a bicycle lock and alarm apparatus which includes an adaptor and a case. The adaptor is mounted to a bicycle framework and comprises a receiving member and a mounting plate. The case is slidably engaged with the mounting plate. The lock and alarm apparatus further includes a flexible cable which has one end secured to the case, and the other end lockable into the receiving member. A latch extends internally from the case into the receiving means for locking the end of the cable. The cable has interior conducting wires for activating the alarm if the cable is cut. The Smith Patent discloses a detachable mounting of the alarm case. However, its cable is not retractable and is locked into the receiving member. Means for detecting the movement of the bicycle and means for adapting a U-bolt lock are also not present.

The Humphrey Patent discloses an alarmed locking apparatus for portable articles, including bicycles. The alarmed locking apparatus includes a flexible cable wound on a retractable spool inside the case. The flexible cable includes conducting wires and a plug-in connector which is provided at the free end of the cable. The plug-in connector can be plugged into the case to establish the electrical connection if the cable is pulled or cut, an alarm sound will be triggered. The alarmed locking apparatus can be mounted to the handlebar of a bicycle and can also be used as a horn. However, the Humphrey Patent alarmed locking apparatus does not detect motion and has no means for adapting a U-bolt lock.

The Rowland Patent discloses an anti-theft device which can be attached to a sports equipment such as a bicycle. It has a motion sensor for activating an alarm if the sports equipment is moved. It also has a motion sensor for activating the alarm if the anti-theft device itself is removed from the sports equipment. The Rowland Patent comprises no locking means.

The Sirman Patent discloses a bicycle lock and alarm apparatus. The bicycle lock and alarm apparatus includes a case containing a spool mechanism which carries a conductive flexible cable. The free end of the cable can be plugged onto a jack socket for locking the bicycle. If the free end of the cable is disconnected it will trigger the alarm. The lock and alarm apparatus further includes a mercury switch for motion detection. The lock and alarm apparatus is attached to a bicycle frame by a bracket or strap. The disadvantage of the Sirman Patent is that a specialized screwdriver has to be used to fasten or unfasten the apparatus to the bicycle, which is required every time the battery needs to be changed. Additionally, no U-bolt lock nor its adaptor is provided.

The Thomas Patent discloses a bicycle alarm apparatus which is mounted to the horizontal framework of the bicycle and can detect the unauthorized rotation of the handlebar. The Thomas Patent does not have any locking features.

The Israel Patent relates to a modular security system designed for protecting garments in display, which is different from the present invention because it is not designed as a portable unit to be mounted on a bicycle.

The Villarreal Patent discloses a motion sensor having a horizontally mounted beam with a level switch for detecting movement such as tilting of the horizontal beam. The Villarreal Patent is generally unrelated to locking apparatus.

The Heller Patent discloses a ski alarm mounted on the flat upper surface of a ski. The alarm has both a mercury switch for detecting unauthorized movement of the ski and a tether switch for detecting the removal of the tether cable.

The Czerwinski Patent is a marine lock and alarm apparatus for protecting docked or parked boats from being tampered with.

From the above analysis, it can be seen that none of the prior art patents has disclosed a combination of multi-mode alarmed locking apparatus with both chain lock and U-bolt lock. In fact none of the prior art lock and alarm apparatus has incorporated means for accommodating a U-bolt lock. Therefore, it is desirable to have a new multi-mode alarmed locking apparatus with all the preferred features of the present invention.

SUMMARY OF THE INVENTION

The present invention is a multi-mode combination locking apparatus and alarm for bicycles, motorcycles and the like.

It is known that various mechanical locks have been used for bicycles, motorcycles and the like. Common mechanical locks include U-bolt locks and cable locks. U-bolt locks are strong and tough, and are often used for locking the frame of a bicycle or the like to another object. Cable locks are often used for locking the detachable wheel or other accessories of the bicycle together with the frame because of the flexibility of the cable locks. In recent years electronic alarms have been utilized with mechanical locks for cycles. Typical electronic alarms include motion alarms and cable alarms. Motion alarms are often used to detect and provide an alarm upon the unauthorized movement of the bicycle or the alarm itself. Cable alarms are often used to detect and provide an alarm upon the tampering with the cable lock such as cutting the cable or pulling off the connector.

It has been discovered, according to the present invention, that there are at least four major disadvantages with the conventional alarm and locking apparatus for bicycles, motorcycles and the like. The first major disadvantage of the conventional cycle alarm and locking apparatus is that they are not integrated or adaptable with the U-bolt locks. None of the prior art cycle alarm and locking apparatus incorporate the U-bolt locks, nor can they adapt the U-bolt locks. However, the U-bolt locks are still preferred by many cyclists because of the rigidity, strength and durability of the U-bolt locks. For example, when a bicycle is locked to a pole, a flexible cable lock usually will not prevent the bicycle from trembling when it is disturbed by, for example, wind or other forces; but a rigid U-bolt lock can certainly keep the bicycle stable. Therefore, it is desirable to have a new combination alarm and locking apparatus for cycles which is integrated or adaptable with a U-bolt lock, in addition to a cable lock.

The second major disadvantage of the conventional cycle alarm and locking apparatus is that although many of them have utilized the cable locks, the cable locks are not properly operated. Some prior art alarm and locking apparatus, such as the Odenz Patent and the Smith Patent, simply have the cable lock hanging outside the case of the alarm, which is very cumbersome when the cable lock is not in use. Other prior art alarm and locking apparatus, such as the Humphrey Patent and Sirman Patent, utilize retractable spools loaded by coil springs. The spring loaded spools can quickly retract the cable lock back to the case.

However, it has also been discovered, according to the present invention, that the uncontrolled retraction of the prior art cable locks often creates two problems. First, when a user pulls out the cable lock, a retracting tension is always applied on the cable lock and the user must always hold the outer end of the cable lock when guiding it through the various parts of the cycle which are to be locked, until the outer end of the cable lock is locked back to the case of the alarmed locking apparatus. Second, when a user unlocks the cable lock, it is retracted back by the spool without control, and sometimes the cable lock may retract back too fast and hurt the user or create some damage on the parts of the cycle, such as scratching off the paint and putting a nick in the bicycle.

It has further been discovered, according to the present invention, that if a releasible one-way rachet mechanism is provided on the spring loaded spool of the cable lock, then the rotation of the retractable spool is restricted. When the cable lock is pulled out, the spool is automatically locked at any intermittent position, so that even if the cable lock is released, it will not be retracted back to the spool unless the user presses a control button. The cable lock only retreats back to the spool automatically when the user desires such a complete retraction.

The third major disadvantage of the conventional cycle alarm and locking apparatus is that they do not have a satisfactory solution for preventing a thief from tampering with the battery compartment. Since removal of the battery will deactivate the alarm completely, it is important to protect the battery from being tampered with. Most prior art cycle alarm and locking apparatus, such as the Odenz Patent, the Smith Patent and the Humphrey Patent, place the battery inside the case of the lock, so the battery is only accessible after the case is opened, to prevent the battery from being removed by an unauthorized person.

However, this kind of arrangement makes it very inconvenient for a legitimate user of the alarm and locking apparatus to replace the battery when needed. Some prior art, such as the Sirman Patent, takes another approach, wherein the door of the battery compartment is positioned on the alarmed locking apparatus such that when the alarmed locking apparatus is attached to the frame of the cycle, the door of the battery compartment is hid behind the frame of the cycle. Again, although this approach may prevent an unauthorized person from re- moving the battery, it also makes it very difficult for the legitimate user to replace the battery. For example, the Sirman Patent requires a special screw driver to gain access of the battery compartment (column 4, lines 9 through 17).

It has additionally been discovered, according to the present invention, that if the alarm circuitry is designed to include a sensor switch which is connected with the battery compartment door and can activate the alarm when the battery compartment door is tampered with, then the battery compartment door can be regularly constructed and positioned at an exposed location but still fully protected. When the battery needs to be replaced, an authorized user can turn the sensor switch off to open the battery compartment without triggering the alarm, and open the battery compartment door without opening the case of the alarm or using special tool.

The fourth major disadvantage of the conventional cycle alarm and locking apparatus is that no visual signal is provided by the alarm and locking apparatus. None of the prior art cycle alarmed locking apparatus has a visual indicator in addition to the audio alarm. It has again been discovered, according to the present invention, that a visual indicator on an alarm and locking apparatus is very useful because it can serve at least two important purposes. First, the visual signal can inform the user at a glance whether the alarm portion of the apparatus is activated or turned off. Second, the visual signal can warn an unauthorized person that the locked cycle has an activated alarm and thereby deter anyone from tampering with the locked cycle or the locking apparatus itself.

It has again been discovered, according to the present invention, that a sophisticated multi-state electronic circuitry needs to be carefully designed for the multi-mode operation of the combination alarm and locking apparatus. If the circuitry is designed around a series high speed low voltage complementary metal oxide semiconductor (CMOS) logic family integrated circuit (IC) chips and a series of logic gate chips, such as Schmitt NAND gates, then the electronic circuitry is able to provide all the desired multi-state multi-mode functions while consuming a minimum amount of energy.

It is therefore a primary object of the present invention to provide a multi-mode combination alarm and locking apparatus for bicycles, motorcycle and the like, which combination alarm and locking apparatus not only includes an elongated flexible cable lock, but also incorporates a strong and rigid U-bolt lock.

It is also an object of the present invention to provide a multi-mode combination alarm and locking apparatus for bicycles, motorcycles and the like, which combination alarm and locking apparatus comprises a compact case and a bracket. The electronic alarming components and the mechanical locking components are all self-contained within the compact case. The bracket can be mounted to a tubular portion of the: frame of a cycle, and the compact case can be detachably attached and locked to the bracket.

It is again an object of the present invention to provide a multi-mode combination alarm and locking apparatus for bicycles, motorcycles and the like, where the bracket can accommodate cycle frame tubes with different diameters. The bracket may include two rigid halves which embraces the cycle frame tube, or one rigid half and one or more flexible fastening bands or straps for attachment to the cycle frame tube. The bracket can only be removed from the tube after the compact case is unlocked and detached from the bracket.

It is another object of the present invention to provide a multi-mode combination alarm and locking apparatus for bicycles, motorcycles and the like, where the electronic circuitry of the combination alarm and locking apparatus includes a motion sensor to detect the unauthorized movement of the cycle or the alarm and locking apparatus itself, as well as a continuity sensor to detect the unauthorized tampering on the cable lock.

It is a further object of the present invention to provide a multi-mode combination alarm and locking apparatus for bicycles, motorcycles and the like, which combination alarm and locking apparatus includes a battery compartment door sensor to detect the unauthorized access to the battery compartment.

It is an even further object of the present invention to provide a multi-mode combination alarm and locking apparatus for bicycles, motorcycles and the like, which combination alarm and locking apparatus utilizes a spring loaded spool for storing and retracting the cable lock, where the retraction of the spring loaded spool is regulated by a releasable one-way rachet mechanism, so that when the cable lock is pulled out, the spool can be automatically locked at any intermittent position, which prevents the cable lock from retreating, unless the user presses a release button to let the spool automatically retract the cable lock back into the case of the locking apparatus.

It is an additional object of the present invention to provide a multi-mode combination alarm and locking apparatus for bicycles, motorcycles and the like, which combination alarm and locking apparatus provides a visual signal both to a legitimate user, informing the user that the apparatus is turned on, and to an unauthorized person, warning the unauthorized person that the locking apparatus has an activated alarm and thereby deter anyone from tampering with the locked cycle or the locking apparatus itself.

It is a further object of the present invention to provide a multi-mode combination alarm and locking apparatus for bicycles, motorcycles and the like, which combination alarm and locking apparatus is controlled by a multi-position switch, so that a user can use a single key to set up the various modes of the alarm and locking apparatus.

It is an additional object of the present invention to provide a multi-mode combination alarm and locking apparatus for bicycles, motorcycles and the like, which combination alarm and locking apparatus has a carefully designed highly sophisticated multi-state electronic circuitry which is designed around a series of high speed low voltage CMOS logic family IC chips and a series of logic gate chips, such as Schmitt NAND gates, so that the electronic circuitry is able to provide all the desired multi-state multi-mode functions while consuming a minimum amount of energy.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
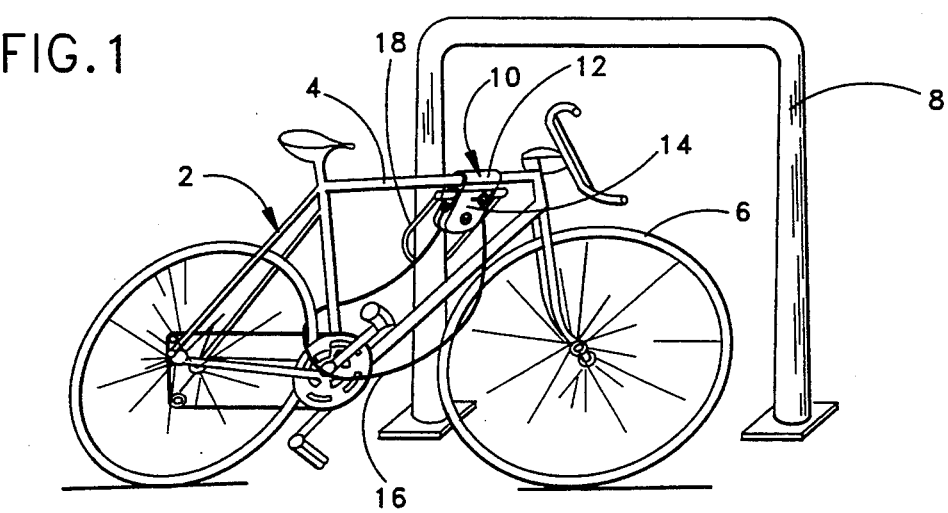
FIG. 1 is a perspective view of the present invention combination alarm and locking apparatus used on a bicycle.

Referring to FIG. 1, there is illustrated a bicycle 2 which is locked to a structure 8 by the present invention combination alarm and locking apparatus 10. It is understood that the present invention combination alarm and locking apparatus 10 may be used with bicycles, motorcycles or the like. The combination alarm and locking apparatus 10 includes two separable parts: a bracket 12 which is mounted to the frame 4 of the bicycle 2, and a case 14 which is detachably attached to the bracket 12. The bracket 12 may be mounted to any tubing part, such as the main horizontal tube, of the bicycle frame 4. The case 14 has a compact design and not only has a flexible cable lock 16, but also incorporates a rigid U-bolt lock 18. The cable lock 16 is useful for locking up the detachable parts of the bicycle, such as the front wheel 6, and other valuable accessories of the bicycle 2. The strong and rigid U-bolt lock 18 is useful to lock the bicycle 2 to the structure to hold the bicycle in an upright position, prevent the bicycle 2 from moving back and forth if, for example, there is a strong wind blowing.

The present invention combination alarm and locking apparatus 10 has a motion sensor for detecting any unauthorized movement of the bicycle 2 or the alarm and locking apparatus 10 itself and activating an auditory alarm when such events occur. It also has a cable sensor for activating the auditory alarm if the cable lock 16 is disconnected from the case 14 or cut off. It further includes a battery door sensor so that if the battery compartment is tampered, the auditory alarm will sound. In addition, the combination alarm and locking apparatus 10 has a visual indicator for informing a user that the alarm is set, and also for warning and deterring an unauthorized person from tampering with the combination alarm and locking apparatus 10.

Figure 2:
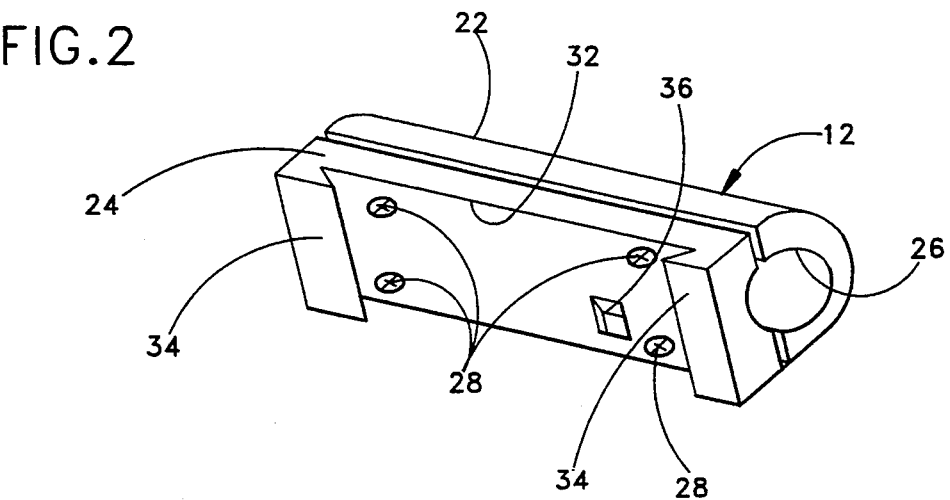
FIG. 2 is a perspective view of the bracket of the present invention combination alarm and locking apparatus.

Referring to FIG. 2, there is shown at 12 the bracket of the present invention combination alarm and locking apparatus 10. The bracket 12 includes a top half 22 and a bottom half 24. The top half 22 and the bottom half 24 have respectively opposite half-cylindrical grooves which, when the top half 22 and the bottom half 24 are assembled together, form a smooth through bore 26 of the bracket 12 for adapting the tubular part of the bicycle frame 4. The top half 22 and the bottom half 24 may be secured together by screw means 28. On the bottom side 32 of the bottom half 24, there are two opposite wedge-shaped flanges 34 for adapting the case 14 of the combination alarm and locking apparatus 10. It is noted that the screws 28 can only be accessed from the bottom side 32 of the bottom half 24. This feature ensures that the screws 28 can only be accessed when the case 14 is removed from the bracket 12, to thereby prevent unauthorized tampering with the bracket. There is also a lock dent 36 located within the slot 34 for accommodating a locking mechanism which locks the case 14 to the bracket 12.

Figure 3:
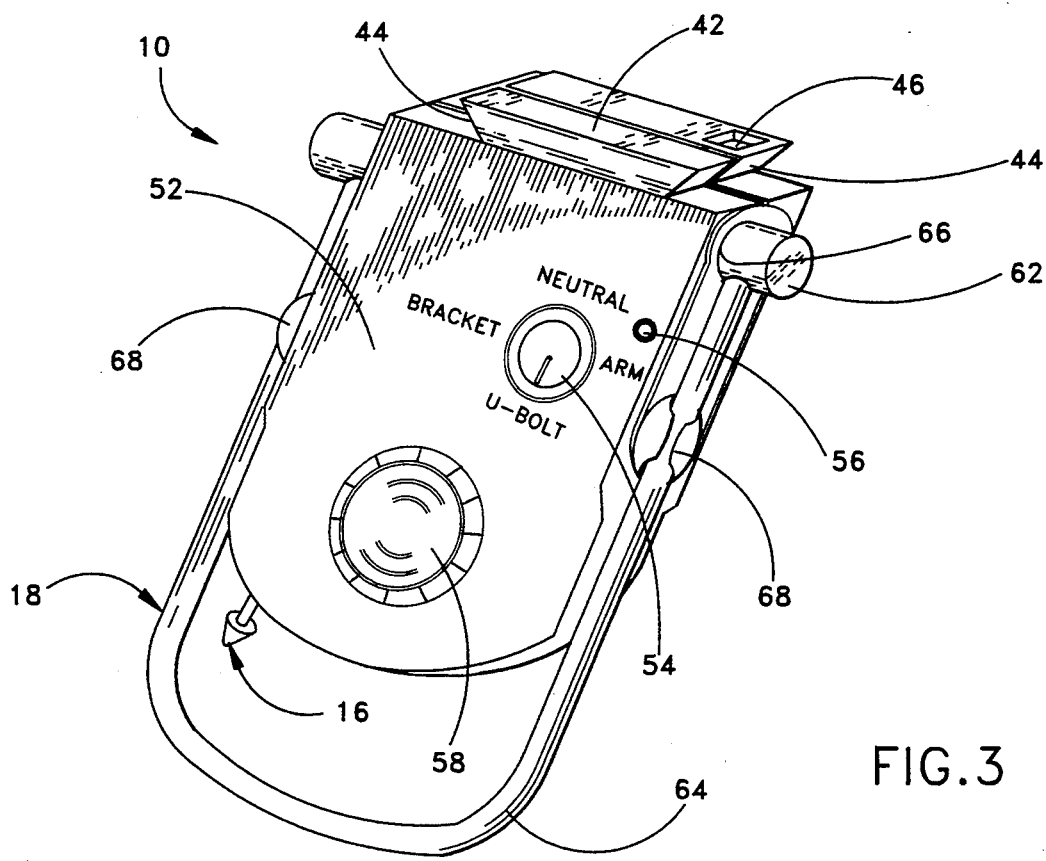
FIG. 3 is a front perspective view of the case of the present invention combination alarm and locking apparatus.

Referring to FIG. 3, there is shown the front view of the case 14 of the present invention combination alarm and locking apparatus 10. At the top end 42 of case 14 there are two opposite wedge-shaped slots 44 for accommodating respectively the two wedge-shaped flanges 34 of the bracket 12. The wedge-shaped flanges 34 are perpendicular to the direction of the smooth bore 26 of the bracket 12. Therefore, when the case 14 is slidably engaged with the bracket 12, the case 14 is moving in a direction perpendicular to the smooth bore 26 of the bracket 12. The feature ensures that when the bracket is first attached to a tubular part of the bicycle frame 4, the case 14 can be conveniently engaged with the bracket 12 without any interference with other parts of the bicycle frame 4.

The wedge-shaped engagement ensure that once attached, the case 14 cannot move relative to the bracket 12 in any direction other than the direction parallel to the flanges 34 and slots 44. On top side 42 of case 14 there is a locking mechanism 46 located at a position which corresponds to the locking dent 36 at the bottom side 32 of the bracket 12. The locking mechanism 46 may be a small tongue extendable into the locking dent 36 to prevent the case 14 from moving relative to the bracket 12 in the direction parallel to the flanges 34 and slots 44. Therefore, once fully engaged and locked, the case 14 cannot move relative to the bracket 12. Of course the flanges on the bracket 12 and the slots on the case 14 can be parallel to the direction of the smooth bore 26 of the bracket 12. It is also within the spirit and scope of the present invention that the flanges can be located on the case 14 and the slots on the bracket 12. Further, any other suitable means may be employed.

On the front side 52 of the case 14 there is a multi-position key switch 54 which can be operated by a single key (key not shown). The key switch 54 may have four positions: a "Neutral" position, an "Arm" position, a "U-bolt" position and a "Bracket" position. When the key switch 54 is turned to the "Neutral" position, the alarm is switched off, the cable lock 16 can be disconnected from the case 14, the U-bolt lock 18 is unlocked, and the case 14 can be disengaged from the bracket. When the case 14 is engaged with the bracket 12 and the key switch 54 is switched to the "Bracket" position, the locking mechanism 46 is operating and the case 14 is locked to the bracket 12. When the key switch 54 is switched to the "U-Bolt" position, the U-bolt lock 18 is locked. When the key switch 54 is switched to the "Arm" position, the alarm is switched on and in working condition, and the visual indicator 56 will blink to indicate the activated status of the alarm. The visual indicator 56 may be a light emitting diode (LED) or other suitable means.

On the front side 52 of the case 14 there is also a round release button 58. The release button 58 serves two purposes. First, it shields a piezo-electric sound transducer underneath. Second, it can be pressed to release the rachet mechanism of the retractable spool of the cable lock 16. These features will be discussed in detail later.

The U-blot 18 includes a base rod 62 and a U-shaped yoke 64. In one embodiment of the present invention combination alarm and locking apparatus 10, the base rod 62 of the U-bolt lock 18 is secured within a bore 66 on the case 14, at a location adjacent to the top end 42 of the case 14. Two lateral snug snaps 68 made of resilient material, such as natural or synthetic rubber, are provided for receiving the yoke 64 of the U-bolt lock 18 in a resting position which is parallel to the case 14, when the U-bolt lock 18 is not in use.

Figure 4:
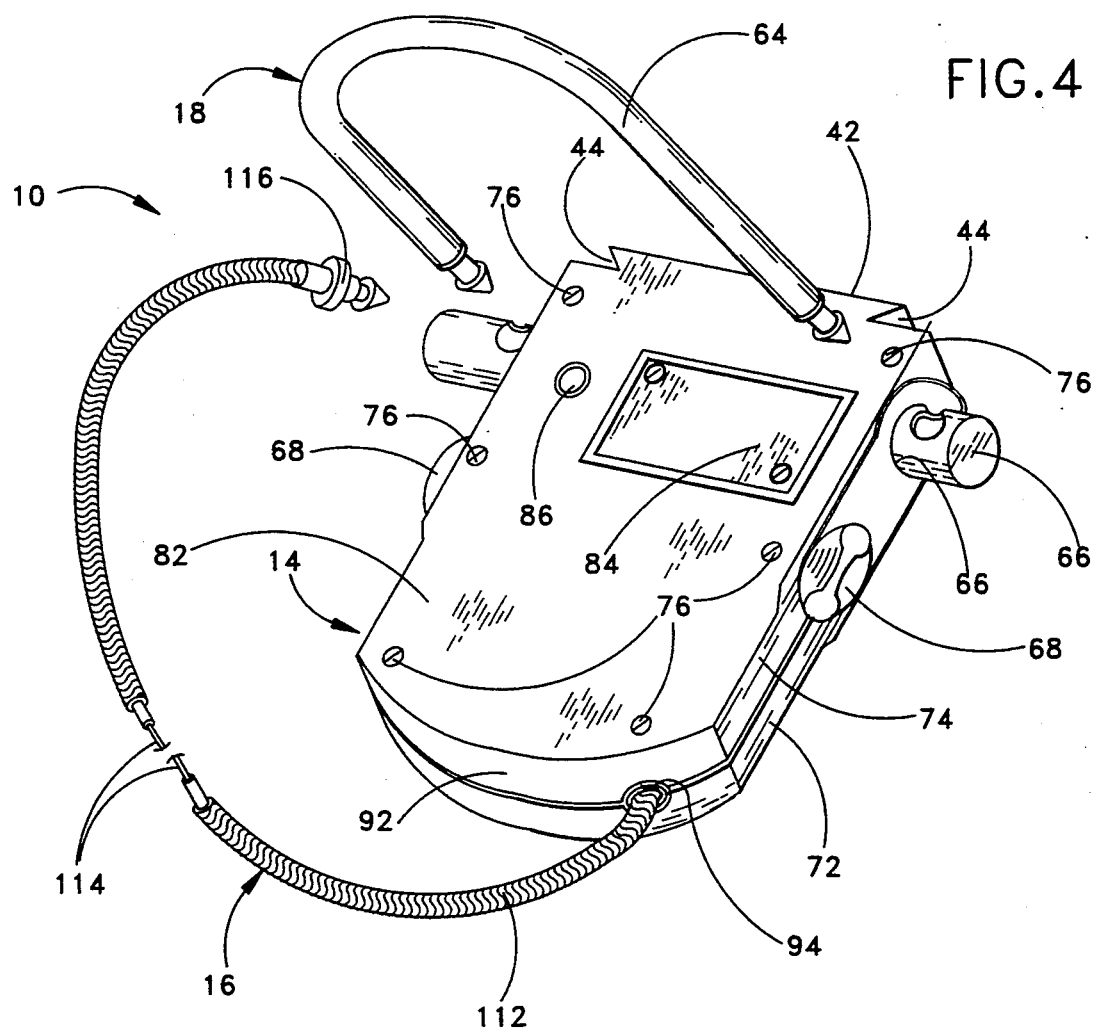
FIG. 4 is a back perspective view of the case of the present invention combination alarm and locking apparatus.

Referring to FIG. 4, there is shown the back view of the case 14 of the present invention combination alarm and locking apparatus 10. Case 14 is formed by two generally symmetric halves: a front half 72 and a back half 74, which are fastened together by screws 76 or other suitable means. On the back side 82 of the case 14, there is a battery compartment door 84. The battery compartment can be accessed by opening the battery door 84. The battery door 84 is connected to a sensor. When the key switch is switched to the "Arm" position, any unauthorized tampering of the battery door 84 will activate the alarm.

At the bottom end 92 of the case 14 there is a cable lock aperture 94. Cable lock 16 can be extended out from, or retracted back into, the case 14 through the aperture 94. Cable lock 16 includes an elongated flexible cable 112 which has internal conductive wires 114, and an outer-end connector 116 which is connected with the internal conductive wires 114. The connector 116 can be plugged into a socket 86 which is located on the back side 82 of the case 14. When the connector 116 is plugged into the socket, electrical connection is established in the internal wires 114 of the cable lock. The internal wires 114 are in turn connected with a sensor, so that when the key switch 54 is turned to the "Arm" position, if the connector 116 is pulled out from the socket 86 or the flexible cable 112 is cut, the piezo-electric sound transducer will sound. Of course the location of the cable lock aperture 94 and socket 86 may be located at other suitable locations on the case 14.

Figure 5:
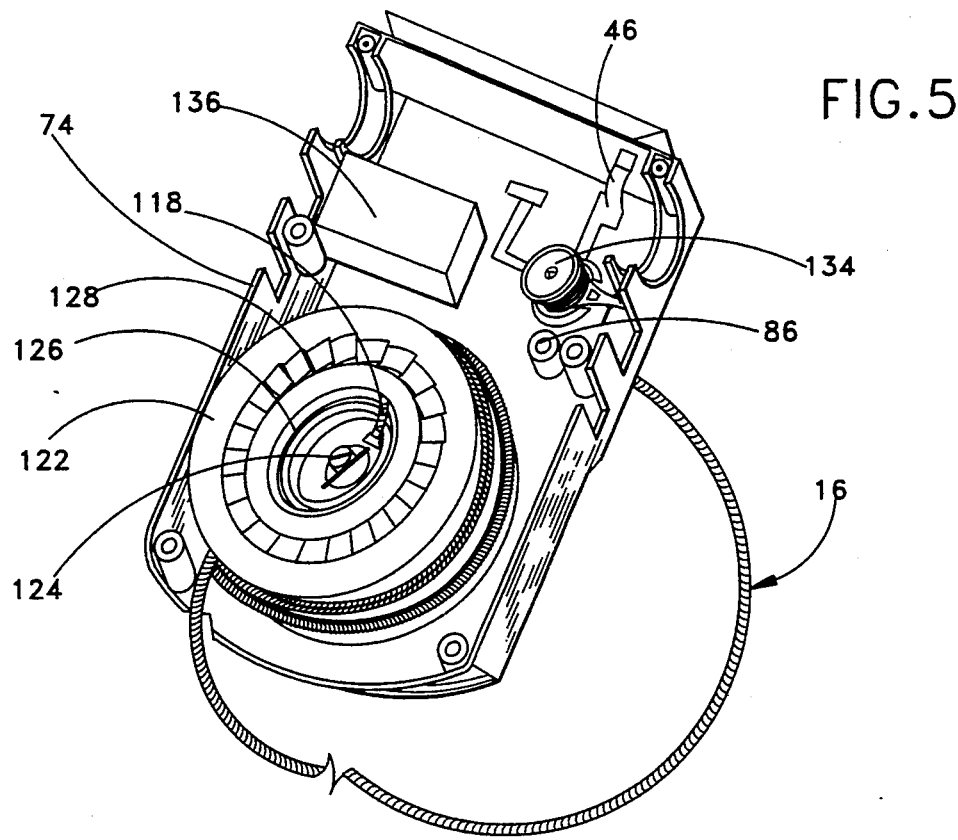
FIG. 5 is a perspective view of the internal arrangement of the present invention combination alarm and locking apparatus.
Figure 6:
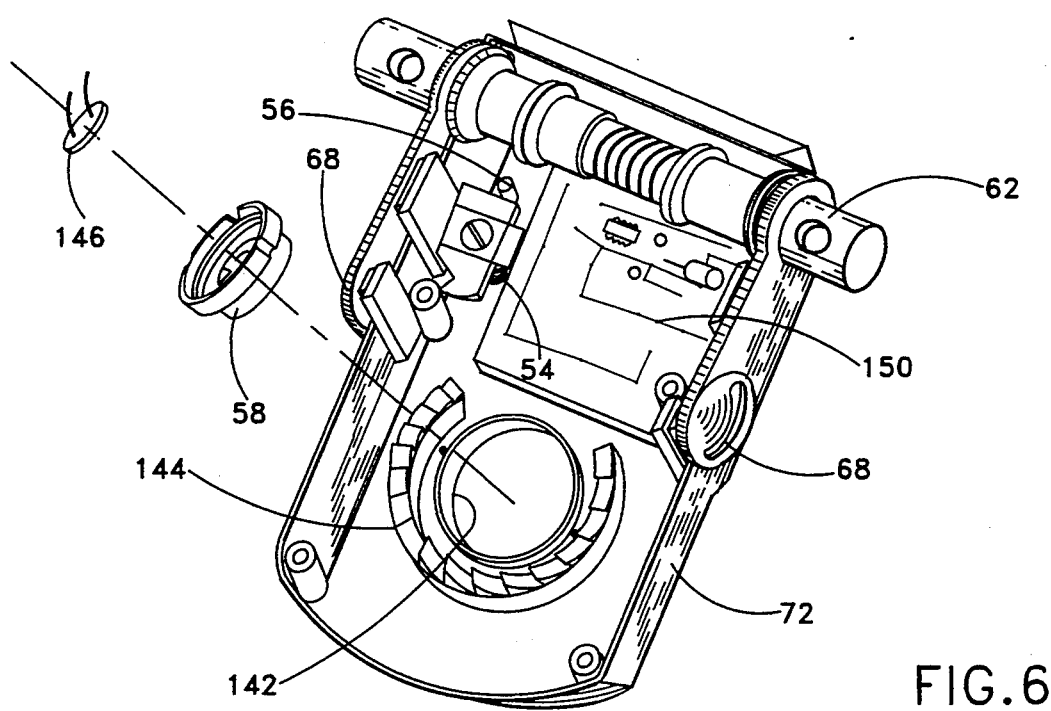
FIG. 6 is also a perspective view of the internal arrangement of the present invention combination alarm and locking apparatus.

Referring to FIGS. 5 and 6, there is shown the internal arrangement of the present invention combination alarm and locking apparatus 10. Shown in FIG. 5, which is the bottom half 74 of the case 14, the cable lock 16 is wound on a spool 122, on which the inner end 118 of the flexible cable 112 is secured. Spool 122 is rotatably mounted on a shaft 124. Spool 122 is also biased by a coil spring 126 for retraction of the flexible cable 112. Spool 122 further has a rachet ring 128 at the top. In addition, spool 122 can slide up and down on the shaft 124, and is biased upwardly by coil springs 132. The internal locking mechanism 134 and the battery compartment 136 are also seen in FIG. 5. The locking mechanism controls the tongue 46 for locking the case 14 to the bracket 12. It also controls the cable lock 16 and the U-bolt lock 18.

Shown in FIG. 6, which is the top half 72 of the case 14, there is an aperture 142 for adapting the release button 58. A rachet ring 144 is provided around the aperture 142. When the top half 72 and the bottom half 74 are assembled together, the two rachet rings 128 and 144 will be engaged because the spool 122 is biased upwardly by the coil springs 132. This rachet mechanism prevent the spool from retracting. The piezo-electric sound transducer 146 is inserted underneath the release button 58, so the release button 58 also serves as the housing for the piezo-electric sound transducer 146.

A printed circuit board (PCB) 150 is also illustrated in FIG. 6. All the electronic components of the alarm circuitry are mounted on the PCB 150. The inner wires 114 of the cable lock 16, the battery compartment 136, and the piezo-electric sound transducer 146 are all electrically connected to the PCB 150.

Figure 7:
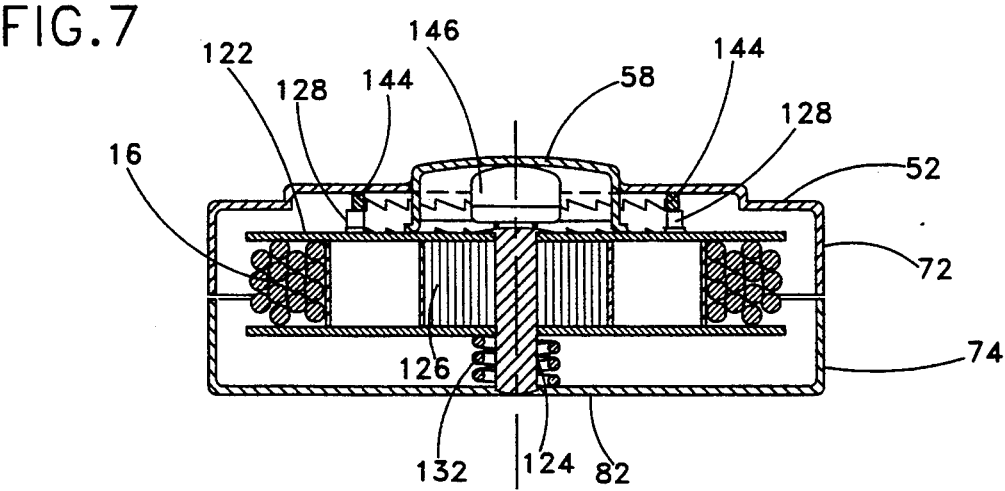
FIG. 7 is a cross-sectional view of the spring loaded rachet controlled cable spool of the present invention combination alarm and locking apparatus.

Referring to FIG. 7, there is shown how the spool works. Normally the rachet rings 144 and 128 are engaged as a one-way rachet mechanism because the spool 122 is biased upwardly by coil springs 132. When the flexible cable 112 is pulled out, the spool 122 can be automatically locked at any intermittent position, which prevents the flexible cable from being retracted by the spool 122. However, if the release button 58 is pressed downwardly from outside of the case 14, the spool 122 will be pushed downwardly as well and the rachet rings 128 and 144 will be disengaged. Once freed, the spool 122 will be driven by the coil spring 126 and will automatically retract the flexible cable 16 back into the case 14.

Figure 8:
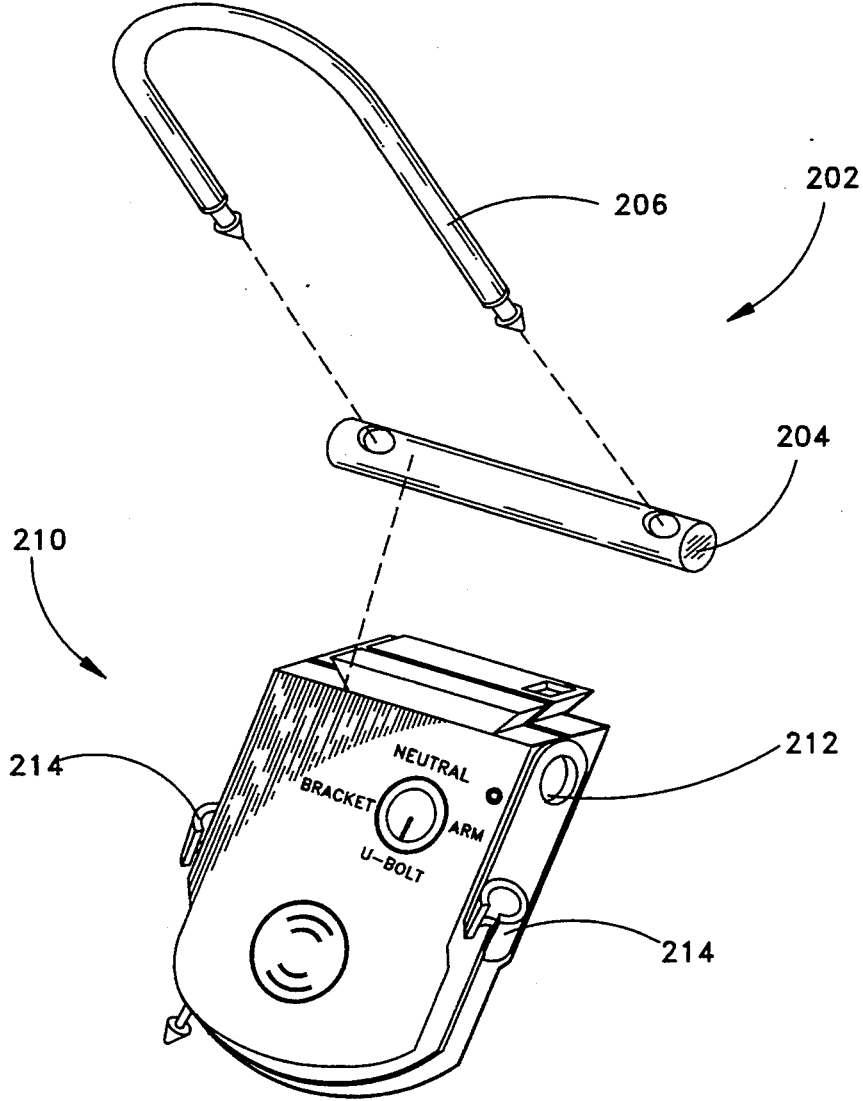
FIG. 8 is a perspective view of an alternative embodiment of the present invention combination alarm and locking apparatus.

Shown in FIG. 8, there is an alternative embodiment 210 of the present invention combination alarm and locking apparatus. The difference is that the apparatus 210 itself will not have its own U-bolt but is capable of adapting a separate U-bolt 202, which may be separately supplied. The combination alarm and locking apparatus 210 has a through bore 212 for receiving the base rod 204 of the U-bolt 202. Furthermore, two U-shaped lateral receivers 214 made of resilient material, such as natural or synthetic rubber, will be provided. The U-shaped receivers 214 are provided for receiving the yoke 206 of the U-bolt lock 202 in a resting position. It is noted that the U-shaped receivers 214 can adapt larger or wider yokes of U-bolts than the snaps 68 shown in the previous embodiment 10. This alternative embodiment is used by one who already has a U-bolt lock and does not wish to purchase a complete unit with its own U-bolt lock. The alternative embodiment is designed to accommodate most conventional U-bolt locks on the market today.

Referring to FIGS. 11 through 14, there is shown at 400 an alternative embodiment of the bracket of the present invention combination alarm and locking apparatus 10. The bracket 400 includes two flexible bands or straps 402 and 404 and a bottom half 410 which may be made of metal or hard plastic materials. The bottom half 410 has a lengthwise channel 412 which has a trapezoid shaped cross-sectional configuration. The cross-section of the channel 412 is trapezoid shaped, rather than semi-circular shaped, because it can better accommodate bicycle frame tubes of with different diameters. Of course the cross-sectional configuration of the channel 412 of the bottom half 410 may be in other shapes, such as a triangular or "V" shape. To further ensure a tight engagement of the bracket 400 and a bicycle frame tube 4, the two flexible bands or straps 402 and 404 are used instead of a top half bracket. The two flexible bands or straps 402 and 404 are secured by screw assemblies 420 to the bottom half 410 of the bracket 400. The two flexible bands or straps 402 and 404 each has extra length for accommodating bicycle frame tubes which have larger diameters.

On the bottom side of the bottom half 410, there are two opposite wedge-shaped flanges 414 for adapting the case 14 of the combination alarm and locking apparatus 10. The screws assembly 420 can only be accessed from the bottom side of the bottom half 400 to ensure that the screw assembly 420 can only be accessed after the case 14 is removed from the bracket 12, thereby preventing unauthorized tampering with the bracket. There is also a lock dent 416 on the bottom half 410 for accommodating a locking mechanism which locks the case 14 to the bracket 12, and a stop bar 418 at one side of the bottom, continuing between wedge-shaped flanges 414, for preventing the case 14 from sliding-out from that side but allowing it to slide-in from the opposite side.

Figure 9:
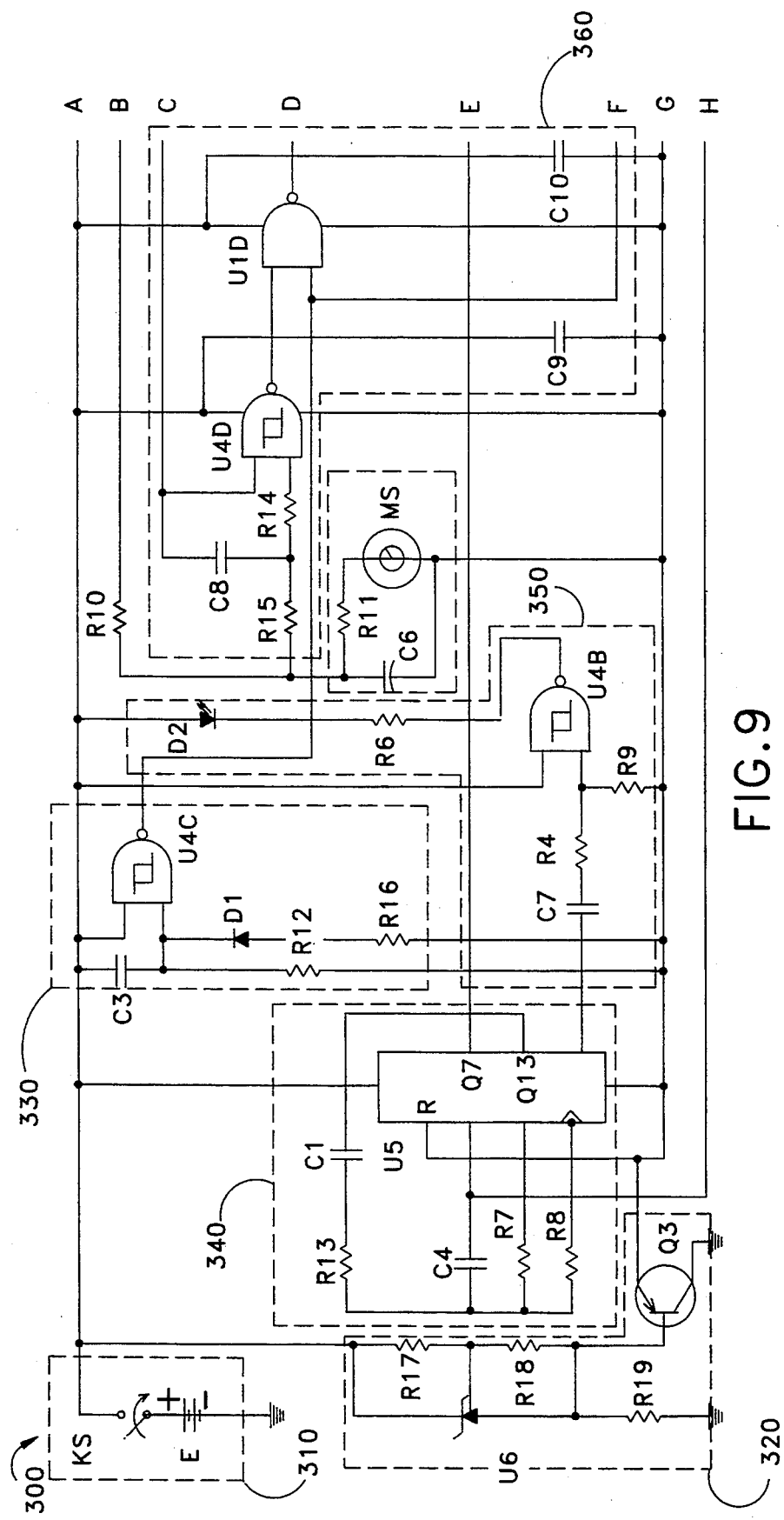
FIG. 9 is the first half of the circuitry diagram of the electronic circuit of the present invention combination alarm and locking apparatus.
Figure 10:
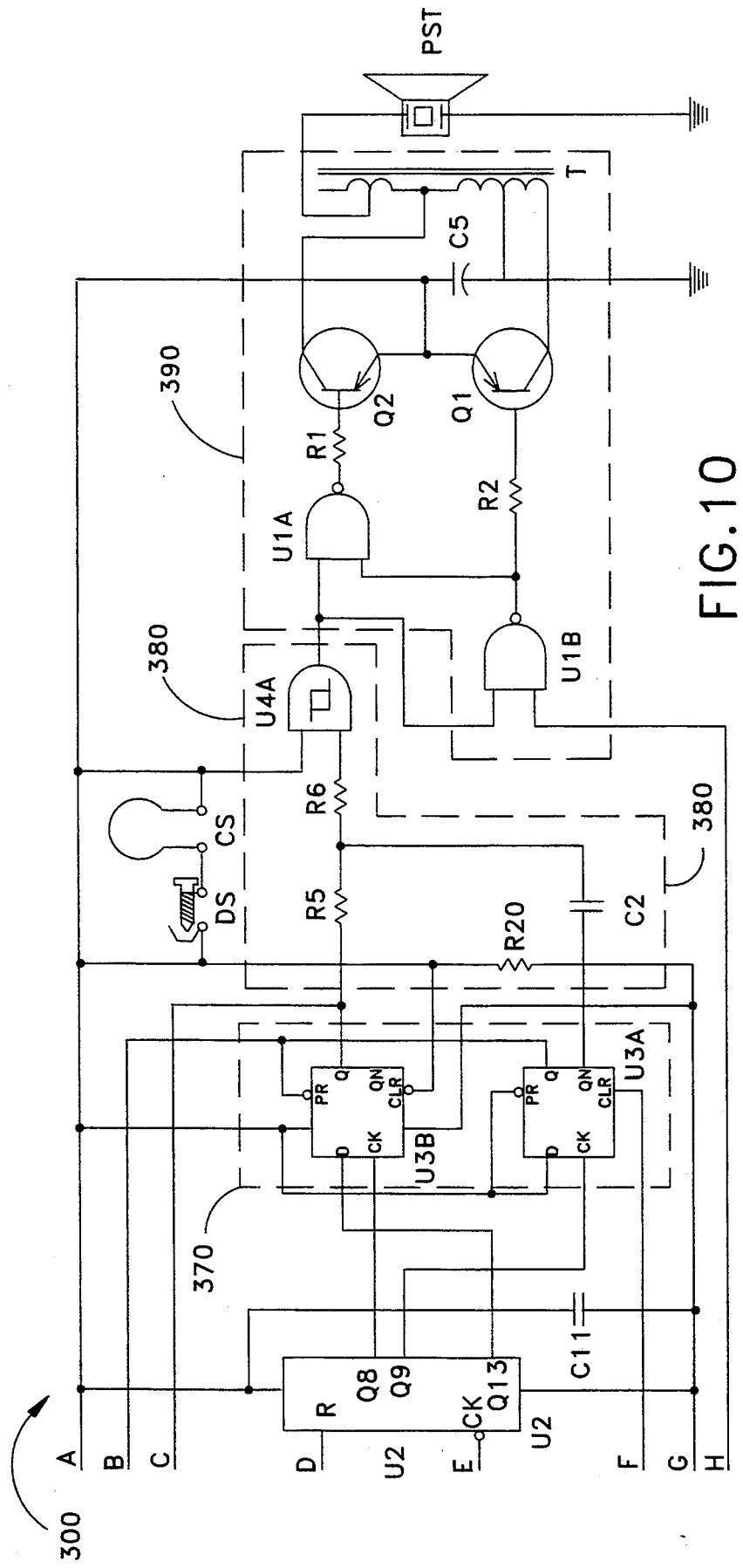
FIG. 10 is the second half of the circuitry diagram of the electronic circuit of the present invention combination alarm and locking apparatus.
Figure 11:
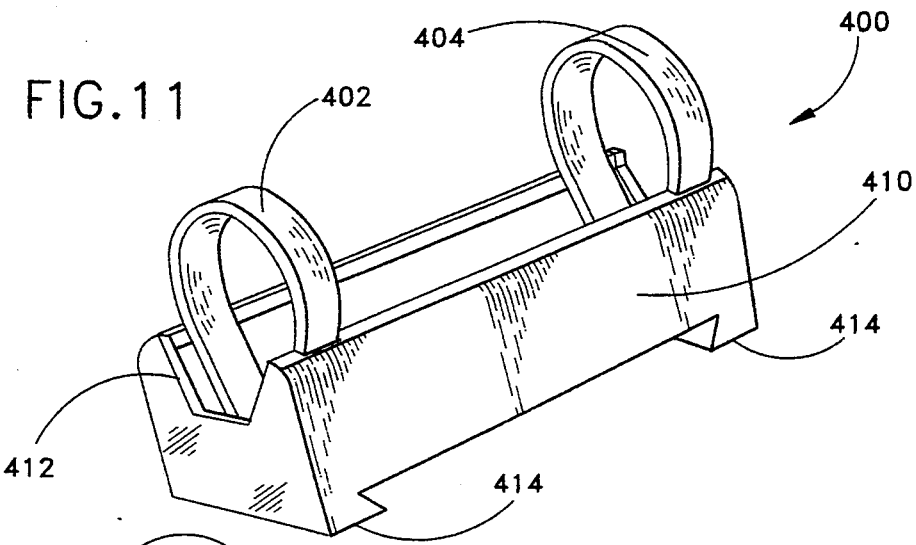
FIG. 11 is a perspective view of an alternative embodiment of the bracket of the present invention combination alarm and locking apparatus.
Figure 12:
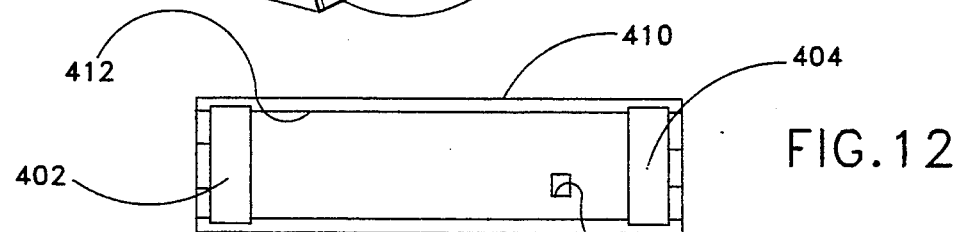
FIG. 12 is a top plan view of the alternative embodiment of the bracket of the present invention combination alarm and locking apparatus.
Figure 13:
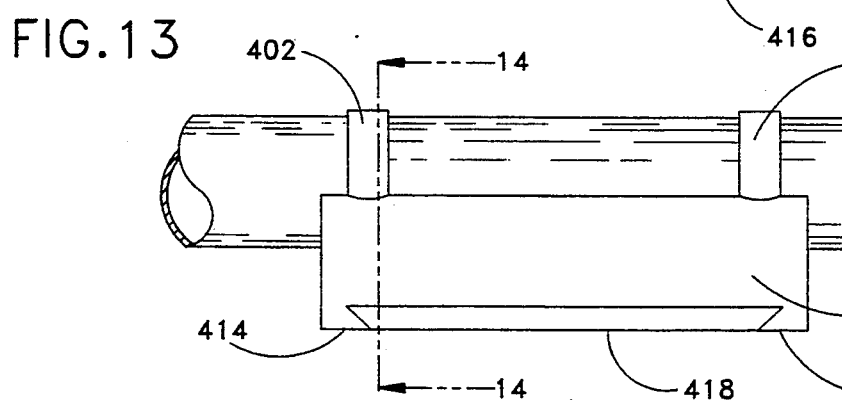
FIG. 13 is a side elevational view of the alternative embodiment of the bracket of the present invention combination alarm and locking apparatus.
Figure 14:
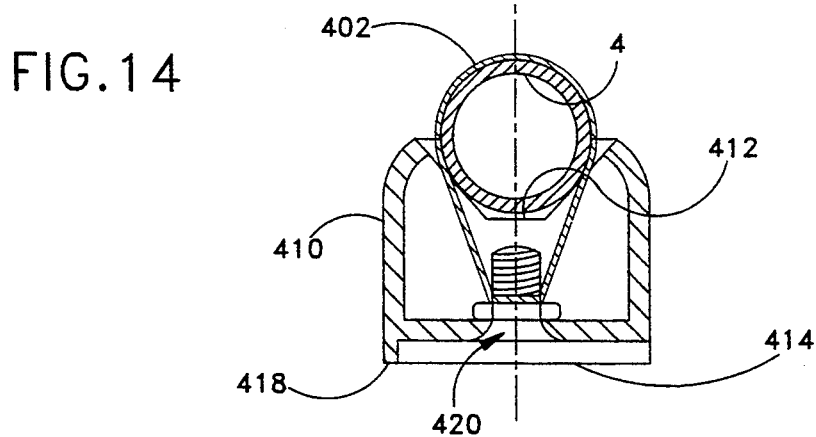
FIG. 14 is a cross-sectional view taken at line 14—14 of FIG. 13.

An electronic circuitry 300 of the present invention combination alarm and locking apparatus is shown in FIGS. 9 and 10. FIG. 9 shows the first half, and FIG. 10 shows the second half, of the circuit diagram. All of the electronic components of the combination alarm and locking apparatus, except the key-switch, the battery, the cable sensor-switch, the battery compartment door sensor-switch, the light emitting diode (LED) and the piezoelectric sound transducer (PST), are physically located on the printed circuit broad (PCB) assembly. Nevertheless all of the electronic components of the combination alarm and locking apparatus are connected in the manner illustrated in FIGS. 9 and 10, where the key-switch is labeled as KS, the battery as E, the motion sensor switch as MS, the cable sensor-switch as CS, and the battery compartment door sensor-switch as DS. All active digital logic elements may be standard members of the 74HCXX high speed low voltage complementary metal oxide semiconductor (CMOS) logic family of integrated circuit (IC) chips. They are interconnected such that their operating states are those defined by standard manufacturers' data sheets. This logic family was chosen for its low operating voltage (down to 2 volts) and its low quiescent power drain. A single analog IC is used to derive the voltage required for the 74HCXX devices.

The electronic circuitry 300 of the present invention alarmed locked apparatus is powered by a power supply circuit 310 which includes the key switch KS and battery E. At power on, which is defined when the key is moved to the "Arm" position, power is applied to the whole circuitry 300. The battery E may be a standard 9 volt alkaline battery which is chosen for its availability, energy density, and ability to operate over the desired temperature range.

The full 9 volts voltage is available only to a voltage regulator circuit 320 and a PST drive circuit 390. The voltage regulator circuit 320 is a voltage reducing shunt/series regulator which includes transistor Q3, resistors R17, R18, and R19, and an adjustable micro-power voltage reference U6 which is connected in a standard configuration with R17 and R18 to provide approximately 2.95 volts to the base of transistor Q3. Current for the reference and the base drive of transistor Q3 is supplied through resistor R19. At the emitter of transistor Q3, the voltage is one forward biased junction lower than that at the base, so that the supply voltage for the 74HCXX IC chips is approximately 2.25 volts. This voltage was chosen to minimize the current requirements of the active digital elements.

The electronic circuitry 300 also includes an initializing circuit 330, which includes a Schmitt nand gate U4C, diode D1, capacitor C3 and resisters R12 and R16. The Schmitt nand gate U4C is used as an inverter to square up the slow rise time of a RC network of resister R12 and capacitor C3. The diode D1 and resister R16 are used to create a power on reset pulse to bring the timer IC chip U2 and an alarm state flip-flop array 370 to a known and initialized state. The reset pulse time is approximately 100 milliseconds with the time constant determined by the RC network of resister R12 and capacitor C3. Diode D1 and resister R16 provide a current limited discharge path when the power is turned off by inserting the key and rotating it to the "Neutral" position.

The flip-flop array 370 includes a flip-flop chip U3A and flip-flop chip U3B. At power on, flip-flop U3A is cleared, which means that at pin Q of flip-flop chip U3A the binary signal is 0 (denoted hereafter as Q=0). Flip-flop U3B is set, which means that at pin Q of flip-flop chip U3A the binary signal is 1 (Q=1). The 14 bit binary counter IC chip U2 is reset to 0 (R=0).

There are essentially three states of the present invention combination alarm and locking apparatus:

state No. 1: power on, but not yet armed, which allows the user to clear the area of the bike; flip-flops U3A Q=0 and U3B Q=1 define this state which lasts approximately 8 seconds;.

state No. 2: armed, but not triggered, which means that the combination alarm and locking apparatus is at this point sensitive to a series of detected motion events which occur during a 4 second period; flip-flops U3A Q=1 and U3B Q=0 define this state which can last indefinitely, but can also last as little as 4 seconds; and state No. 3: triggered, which means that the combination alarm and locking apparatus is at this point emitting a loud modulated tone; flip-flops U3A Q=1 and U3B Q=1 define this state, where if the combination alarm and locking apparatus was triggered by a motion sense event, this state is a timed state which lasts approximately 2 minutes at which point the alarm reverts back to State No. 2; and if the combination alarm and locking apparatus was triggered by a cable integrity loss event or battery compartment door tamper event, this state will remain until the: removal of power or the reversal of the triggering event.

The electronic circuitry 300 further includes an clock generator circuit 340, which includes a clock generator IC chip U5, capacitors C1 and C4, and resisters R7, R8 and R13. Most of the timing required in the circuitry is derived from a single clock which is an integral part of IC chip U5. IC chip U5 is a 14 bit binary ripple counter IC which includes a clock generator. This clock operates at approximately 4 KHz, the frequency required by the PST to produce the maximum amount of sound. The actual clock rate is fixed by an RC network which includes resistor R7 and capacitor C4. Capacitor C4 is a film capacitor chosen for minimum frequency drift over the required operating temperature range. The warble modulation is provided by the additional feedback path of resistor R13 and capacitor C1 which inject a small error signal approximately every 0.25 second into the clock generator IC chip U5.

The clock IC chip U5 and counter IC chip U2 are free running as long as power is applied. The Q7 output pin of IC chip U5 provides a pulse approximately every 65 milliseconds which is used as a clock for counter IC chip U2 to achieve the 4 second, 8 second and 2 minute timing defined in the states above.

The Q13 output of IC chip U5 provides a pulse approximately every 2 seconds which drives a diode driver circuit 350. The diode driver circuit 350 includes a differentiating network of capacitor C7, resister R9 and Schmitt nand gate U4B which is used as an inverter and driver for LED diode D2. The LED diode D2 is thus pulsed once every two seconds. The "on" time for the LED diode D2 is approximately 40 milliseconds, which is determined by the time constant of capacitor C7 and resister R9 and is kept small to preserve battery life. The LED diode D2 is a high efficiency device requiring only 2 to 3 milliamperes when lit. Resister R6 defines the upper limit of that current.

Once powered, binary ripple counter IC chip U2 is clocked approximately every 65 milliseconds. The counter IC chip U2 will change state with each clock pulse unless it is held reset, at which state all outputs of U2 are low.

During initial power on reset,, the reset pulse of IC chip U4C is gated to counter IC chip U2 through a reset circuit 360 which includes a nand gate U1D, a Schmitt nand gate U4D, resistors R14 and R15 and capacitors C8, C9 and C10. The reset pulse of IC chip U4C is gated to counter IC chip U2 through one of the two inputs of nand gate U1D. This same reset pulse brings flip-flops U3A and U3B to state No. 1. With flip-flops U3A Q=0, and in the absence of the power on reset, the reset input of counter IC chip U2 is held low (not reset) and counter IC chip U2 will act as the 8 second timer required for state No. 1. After approximately 8 seconds, the Q9 output of counter IC chip U2 changes states, clocking flip-flop U3A and creating state No. 2. The negative going transition of flip-flop U3A as pin QN (QNot) is passed through a differentiating circuit 380 of capacitor C2, resistors R5 and R6, and Schmitt nand gate U4A, which causes a momentary chirp by allowing the 4 KHz clock to energize the PST for a short period of time. The length of the chirp is defined by the time constant of capacitor C2 and resister R5.

During state No. 1, flip-flop U3B is held preset (Q=1) by direct connection of its PR (PResetbar) input to the U3A Q output. During all subsequent state changes (No. 2 to No. 3 to No. 2, etc.), the PR input of U3B is no longer asserted, and as long as its CLR (Clearbar) input is also not asserted, a positive transition at the CK (ClocK) input of U3B will cause it to change states if its Q output does not match its D input.

During state No. 1, counter IC chip U2 will be held reset in the absence of any detected motion. This is done through the path from the motion sensor MS and the interconnection of the reset circuit 360.

Motion sensor switch MS may be a mercury switch which has been uniquely constructed so that in the absence of any motion, but in any physical orientation it remains open. However, any change of position or orientation causes it to close momentarily. During state No. 1, the input of U4D is connected to the network of capacitor C6 and resistors R10 and R11, and motion sensor switch MS will be at the level of the Q output of flip-flop U3A (Q=1) in the absence of any detected motion and counter IC chip U2 will not count (R=1). Detected motion allows motion sensor switch MS to close, creating a discharge path for capacitor C6 through resistors R11 and motion sensor switch MS that easily overrides the charge path of resistor R10 and causes the reset to be removed from counter IC chip U2 allowing it to count. Resistor R11 limits the maximum current through motion sensor switch MS. Resistor R10 and capacitor C6 provide the time constant for how long the reset will remain unasserted on counter IC chip U2. This time constant determines in part the sensitivity of the unit to motion, and resistor R10 and capacitor C6 have been selected such that it takes multiple motion events in a 4 second period of time to keep the reset of counter IC chip U2 from being reasserted. Should these conditions be met, counter IC chip U2 will, after approximately 4 seconds, deliver a positive going transition on its Q8 output which is the CK input of flip-flop U3B and cause flip-flop U3B to change states to Q=0 on its output. This defines state No. 3.

With Q=0 at flip-flop U3-B, the 4 KHz clock is gated through differential circuit 380 into the PST driver circuit 390 defined by nand gates U1B, U1A, R1, resistors R1 and R2, transistors Q1 and Q2, and transformer T. Transistors Q1 and Q2 and transformer T form a conventional push-pull output which is reduced in voltage, through half the secondary winding of transformer T, to optimize the drive signal to PST, which optimized signal is a peak to peak signal that equals approximately 30 volts despite the limitation of a 9 volt power source.

During state No. 3, counter IC chip U2 will once again count independent of the state of the motion sensor switch MS. The reset of counter IC chip U2 is forced to its unasserted state by the path from the Q output of flip-flop U3B through reset circuit 360.

State No. 3 is thus defined as the active alarm state with the PST producing a very noticeable warbling tone. After approximately 2 minutes, the output condition of the counter IC chip U2 will be such that the Q13 output will be high, which is in turn the D input for flip-flop U3B, and there will be a positive going transition on the Q8 output. Flip-flop U3B then again toggles, returning the circuitry to state No. 2. In the reset circuit 360, the path through capacitor C8 and resistor R15 asserts a short reset pulse to the reset input R of counter IC chip U2 so that new motion events will be immediately detected if they are occurring when the state No.

3 to state No. 2 transition occurs. In the absence of this path, the alarm might not retrigger for significantly longer than 4 seconds in the presence of motion events.

An additional condition which can be presented to the logic of the circuitry is the loss of integrity of the cable while the circuitry is armed. The cable continuity sensor switch CS is in the path of the CLR input of flip-flop U3B which holds it in the unasserted state. In the absence of this conductor, the path through resistor R20 will trigger flip-flop U3B immediately, and the alarm will continue to sound until the conductive path is restored, or the key is used to disarm the alarm, or the battery dies.

A final condition which can be presented to the logic of the circuitry is an attempt to remove the battery compartment door while the circuit is armed. The battery door tamper switch DS is activated if the compartment door is removed. This door switch DS is electrically in series with the cable integrity sensor switch CS, and the results of activating the alarm from this switch DS are identical to those resulting from cable integrity loss.

The present invention has been described above in significant detail. However, it is understood that the detailed description is only illustrative as to the principles of the present invention. The various embodiments, includes the variations of the brackets such as having symmetric halves or utilizing flexible straps, the variations of U-bolt lock configurations such as having integrated U-bolt lock or being adaptable with an existing U-bolt lock, and the variations of the resilient lateral members for accommodating the U-bolt, are all examples of the numerous viable modes of the present invention which are deemed to be within the spirit, scope and contemplation of the present invention as further specified in the appended claims.

Defined in detail, the present invention is a multi-mode combination alarm and locking apparatus for bicycles, motorcycles and like cycles having frame structure with a tubular section, the multi-mode combination alarm and locking apparatus comprising: (a) a hollow tubular bracket mounted to said tubular section of said frame structure of a cycle, the bracket including two separable halves and means for securing the two halves once they embrace the tubular section; (b) a case slidably engageable with said bracket which connects the case to the cycle, the case when fully engaged shielding said securing means on said bracket and being lockable to said bracket; (c) a U-bolt lock including a base rod and a U-shaped yoke lockable to the base rod, the base rod rotatably retained in a through bore of said case, and the U-shaped yoke snugly engageable with two opposite lateral snaps made of resilient material and mounted on said case; (d) a cable lock including an elongated flexible cable which has a conductive core, the cable being wound on a retractable spool and extendable to outside of said case; (e) said spool being biased by a coil spring and engaged with a rachet mechanism which controls the retraction of said spring, the rachet mechanism being releasible by means accessible from outside of said case; (f) said case further retaining a key switch, a power supply, a motion sensor, a tamper sensor, a cable continuity sensor, an auditory alarm and a visual indicator, all electrically connected with an electronic circuitry contained within said case; (g) said key switch being switchable from outside of said case by a single key for locking or unlocking said U-bolt lock, locking or unlocking said cable lock, and locking or unlocking said case with said bracket, and being switchable to a position at which said circuitry is energized and said visual indicator blinks; (h) said power supply contained within a power supply compartment of said case, and said tamper sensor detecting unauthorized tampering with the power supply compartment and triggering said auditory alarm; (i) said motion sensor detecting unauthorized movement of said cycle or said combination alarm and locking apparatus and triggering said auditory alarm; and (j) said cable continuity sensor detecting unauthorized cutting or disconnecting of said cable lock and triggering said auditory alarm; (k) whereby when said combination alarm and locking apparatus is detachably mounted to said cycle and includes both said U-bolt lock and said cable lock for locking said cycle, it can provide multi-mode alarm protection including motion detection, power compartment tamper detection and cable lock continuity detection, all operable with said single key.

Defined alternatively in detail, the present invention is a multi-mode combination alarm and locking apparatus used in conjunction with a U-bolt lock which has base rod and a U-shaped yoke lockable to the base rod, for protecting bicycles, motorcycles and like cycles having frame structure with a tubular section, the multi-mode combination alarm and locking apparatus comprising: (a) a hollow tubular bracket mounted to said tubular section of said frame structure of a cycle, the bracket including two separable halves and means for securing the two halves once they embracing the tubular section; (b) a case slidably engageable with said bracket which connects the case to the cycle, the case when fully engaged shielding said securing means on said bracket and being lockable to said bracket; (c) said case having a smooth through bore for accommodating said base rod of said U-bolt, and two opposite lateral U-shaped receivers made of resilient material for snug engagement with said U-shaped yoke of said U-bolt; (d) a cable lock including an elongated flexible cable which has a conductive core, the cable being wound on a retractable spool and extendable to outside of said case; (e) said spool being biased by a coil spring and engaged with a rachet mechanism which control the retraction of said spring, the rachet mechanism being releasible by means accessible from outside of said case; (f) said case further retaining a key switch, a power supply, a motion sensor, a tamper sensor, a cable continuity sensor, an auditory alarm and a visual indicator, all electrically connected with an electronic circuitry contained within said case; (g) said key switch being switchable from outside of said case by a single key for locking or unlocking said cable lock, and locking or unlocking said case with said bracket, and being switchable to a position at which said circuitry is energized and said visual indicator blinks; (h) said power supply contained within a power supply compartment of said case, and said tamper sensor detecting unauthorized tampering with the power supply compartment and triggering said auditory alarm; (i) said motion sensor detecting unauthorized movement of said cycle or said combination alarm and locking apparatus and triggering said auditory alarm; and (j) said cable continuity sensor detecting unauthorized cutting or disconnecting of said cable lock and triggering said auditory alarm; (k) when said combination alarm and locking apparatus can be detachably mounted to said cycle and used together with said U-bolt lock, and further provide said cable lock for locking said cycle, and can provide multi-mode alarm protection including motion detection, power compartment tamper detection and cable lock continuity detection, all operable with said single key.

Defined also alternatively in detail, the present invention is a multi-mode combination alarm and locking apparatus for bicycles, motorcycles and like cycles having a frame structure with a tubular section, the multi-mode combination alarm and locking apparatus comprising: (a) a bracket mounted to said tubular section of said frame structure of a cycle, the bracket including two flexible upper straps and a rigid lower half block, where the rigid lower half block has a lengthwise groove for accommodating said tubular section, and the two flexible upper straps can be releasibly fastened around said tubular section and to the lower half block by securing means; (b) a case slidably engageable with said lower half block of said bracket which connects the case to the cycle, the case when fully engaged shielding said securing means on said bracket and being lockable to said bracket; (c) a U-bolt lock including a base rod and a U-shaped yoke lockable to the base rod, the base rod rotatably retained in a through bore of said case, and the U-shaped yoke; snugly engageable with two opposite lateral members made of resilient material and mounted on said case; (d) a cable lock including an elongated flexible cable which has a conductive core, the cable being wound on a retractable spool and extendable to outside of said case; (e) said spool being biased by a coil spring and engaged with a rachet mechanism which controls the retraction of said spring, the rachet mechanism being releasible by means accessible from outside of said case; (f) said case further retaining a key switch, a power supply, a motion sensor, a tamper sensor, a cable continuity sensor, an auditory alarm and a visual indicator, all electrically connected with an electronic circuitry contained within said case; (g) said key switch being switchable from outside of said case by a single key for locking or unlocking said U-bolt lock, locking or unlocking said cable lock, and locking or unlocking said case with said bracket, and being switchable to a position at which said circuitry is energized and said visual indicator blinks; (h) said power supply contained within a power supply compartment of said case, and said tamper sensor detecting unauthorized tampering with the power supply compartment and triggering said auditor) alarm; (i) said motion sensor detecting unauthorized movement of said cycle or said combination alarm and locking apparatus and triggering said auditory alarm; and (j) said cable continuity sensor detecting unauthorized cutting or disconnecting of said cable lock and triggering said auditory alarm; (k) whereby when said combination alarm and locking apparatus is detachably mounted to said cycle and includes both said U-bolt lock and said cable lock for locking said cycle, it can provide multi-mode alarm protection including motion detection, power compartment tamper detection and cable lock continuity detection, all operable with said single key.

Defined again alternatively in detail, the present invention is a multi-mode combination alarm and locking apparatus used in conjunction with a U-bolt lock which has base rod and a U-shaped yoke lockable to the base rod, for protecting bicycles, motorcycles and like cycles having a frame structure with a tubular section, the multi-mode combination alarm and locking apparatus comprising: (a) a bracket mounted to said tubular section of said frame structure of a cycle, the bracket including two flexible upper straps and a rigid lower half block, where the rigid lower half block has a lengthwise groove for accommodating said tubular section, and the two flexible upper straps can be releasibly fastened around said tubular section and to the lower half block by securing means; (b) a case slidably engageable with said lower half of said bracket which connects the case to the cycle, the case when fully engaged shielding said securing means on said bracket and being lockable to said bracket; (c) said case having a smooth through bore for accommodating said base rod of said U-bolt, and two opposite lateral members made of resilient material for snug engagement with said U-shaped yoke of said U-bolt; (d) a cable lock including an elongated flexible cable which has a conductive core, the cable being wound on a retractable spool and extendable to outside of said case; (e) said spool being biased by a coil spring and engaged with a rachet mechanism which controls the retraction of said spring, the rachet mechanism being releasible by means accessible from outside of said case; (f) said case further retaining a key switch, a power supply, a motion sensor, a tamper sensor, a cable continuity sensor, an auditory alarm and a visual indicator, all electrically connected with an electronic circuitry contained within said case; (g) said key switch being switchable from outside of said case by a single key for locking or unlocking said cable lock, and locking or unlocking said case with said bracket, and being switchable to a position at which said circuitry is energized and said visual indicator blinks; (h) said power supply contained within a power supply compartment of said case, and said tamper sensor detecting unauthorized tampering with the power supply compartment and triggering said auditory alarm; (i) said motion sensor detecting unauthorized movement of said cycle or said combination alarm and locking apparatus and triggering said auditory alarm; and (j) said cable continuity sensor detecting unauthorized cutting or disconnecting of said cable lock and triggering said auditory alarm; (k) whereby when said combination alarm and locking apparatus is detachably mounted to said cycle and used together with said U-bolt lock, and further provides said cable lock for locking said cycle, it can provide multi-mode alarm protection including motion detection, power compartment tamper detection and cable lock continuity detection, all operable with said single key.

Defined broadly, the present invention is a multi-mode combination alarm and locking apparatus for bicycles, motorcycles and like cycles having frame structure with a tubular section, the multi-mode combination alarm and locking apparatus comprising: (a) a hollow bracket which can be detachably mounted to said tubular section of said frame structure of a cycle; (b) a case which can be detachably mounted to said bracket the case being lockable to said bracket; (c) a U-bolt lock including a base rod which is retained by said case and a U-shaped yoke lockable to the base rod; (d) a cable lock having an elongated flexible cable with a conductive core and retained by a retractable spool which is releasibly engaged with means for controlling the retraction of the spool; (e) a key switch, a power supply, a motion sensor, a tamper sensor, a cable continuity sensor, an auditory alarm and a visual indicator, all retained by said case and electrically connected to an electronic circuitry located within said case; (f) said key switch being switchable from outside of said case by a single key for locking or unlocking said U-bolt lock, locking or unlocking said cable lock, locking or unlocking said case with said bracket, and for switching on said circuitry and said visual indicator; (g) said power supply contained within a power supply compartment of said case, and said tamper sensor detecting unauthorized tampering with the power supply compartment and triggering said auditory alarm; (h) said motion sensor detecting unauthorized movement of said cycle or said combination alarm and locking apparatus and triggering said auditory alarm; and (i) said cable continuity sensor detecting unauthorized cutting or disconnecting of said cable lock and triggering said auditory alarm; (j) whereby when said combination alarm and locking apparatus is detachably mounted to said cycle and includes both said U-bolt lock and said cable lock for locking said cycle, it can provide multi-mode alarm protection including motion detection, power compartment tamper detection and cable lock continuity detection, all operable with said single key.

Alternatively defined broadly, the present invention is a multi-mode combination alarm and locking apparatus used in conjunction with a U-bolt lock for protecting bicycles, motorcycles and like cycles, the multi-mode combination alarm and locking apparatus comprising: (a) a case detachably attachable to a cycle; (b) said case having a through bore for accommodating a portion of said U-bolt such that when said U-bolt is locked, said case is locked with said U-bolt lock; (c) a cable lock retained by said case; (d) key switch, a power supply, a motion sensor, a cable continuity sensor, and an auditory alarm all retained by said case and electrically connected to an electronic circuitry located within said case; (e) said key switch being switchable from outside of said case by a single key for locking or unlocking said cable lock, and for switching on said circuitry; (f) said motion sensor detecting unauthorized movement of said cycle or said combination alarm and locking apparatus and triggering said auditory alarm; and (g) said cable continuity sensor detecting unauthorized cutting or disconnecting of said cable lock and triggering said auditory alarm; (h) when said combination alarm and locking apparatus can be detachably mounted to said cycle and used together with said U-bolt lock, and :further provide said cable lock for locking said cycle, and can provide multi-mode alarm protection including motion detection, power compartment tamper detection and cable lock continuity detection, all operable with said single key.

Defined more broadly, the present invention is a multi-mode combination alarm and locking apparatus for bicycles, motorcycles and like cycles, comprising: (a) a bracket detachably attachable to said frame structure of a cycle; (b) a case detachably attachable and lockable to said bracket; (c) a U-bolt lock retained by said case; (d) a cable lock having an elongated flexible cable wound on a retractable spool which is releasibly engaged with means for controlling the retraction of the spool; (e) a key switch, a power supply, a tamper sensor and an auditory alarm all retained by said case and electrically connected to an electronic circuitry located within said case; (f) said key switch being switchable from outside of said case by a single key for locking or unlocking said U-bolt lock, locking or unlocking said cable lock, locking or unlocking said case with said bracket, and for switching on said circuitry; and (g) said power supply contained within a power supply compartment of said case, and said tamper sensor detecting unauthorized tampering with the power supply compartment and triggering said auditory alarm; (h) when said combination alarm and locking apparatus can be detachably mounted to said cycle and have both said U-bolt lock and said cable lock for locking said cycle, and also alarm protection including power compartment tamper detection, all operable with said single key.

Defined even more broadly, the present invention is a multi-mode combination alarm and locking apparatus for bicycles, motorcycles and like cycles, comprising: (a) a case detachably attachable to a cycle; (b) a U-bolt lock retained by said case; (c) a cable lock retained by said case; (d) a key switch, a power supply, a motion sensor, a cable continuity sensor, and an auditory alarm all retained by said case and electrically connected to an electronic circuitry located within said case; (e) said key switch being switchable from outside of said case by a single key for locking or unlocking said U-bolt lock, locking or unlocking said cable lock, and for switching on said circuitry; (f) said motion sensor detecting unauthorized movement of said cycle or said combination alarm and locking apparatus and triggering said auditory alarm; and (g) said cable continuity sensor detecting unauthorized cutting or disconnecting of said cable lock and triggering said auditory alarm; (h) when said combination alarm and locking apparatus can be detachably mounted to said cycle and have both said U-bolt lock and said cable lock for locking said cycle, and also alarm protection including motion detection and cable continuity detection, all operable with said single key.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A multi-mode combination alarm and locking apparatus for bicycles and motorcycles having a frame structure with a tubular section, the multi-mode combination alarm and locking apparatus comprising:

a. a hollow tubular bracket mounted to said tubular section of said frame structure of a cycle, the bracket including two separable halves and means for securing the two halves once they embrace the tubular section;

b. a case slidably engaged with said bracket from outside of the case, said bracket connects the case to the cycle, the case completely separable from said bracket even as said bracket remains attached to said tubular section of said frame structure, the case when fully engaged shielding said securing means on said bracket and being lockable to said bracket;

c. a U-bolt lock including a base rod and a U-shaped yoke lockable to the base rod, the base rod rotatably retained in a through bore of said case, find the U-shaped yoke for snug engagement with two opposite lateral members made of resilient material and mounted on said case;

d. a cable lock including an elongated flexible cable which has a conductive core, the cable being wound on a retractable spool and extendable to outside of said case;

e. said spool being biased by a coil spring and engaged with a rachet mechanism which controls the retraction of said spring, the rachet mechanism being released by means accessible from outside of said case;

f. said case further retaining a key switch, a power supply, a motion sensor, a tamper sensor, a cable continuity sensor, an auditory alarm and a visual indicator, all electrically connected with an electronic circuitry contained within said case;

g. said key switch being switched from outside of said case by a single key for locking or unlocking said U-bolt lock, locking or unlocking said cable lock, and locking or unlocking said case with said bracket, and being switched to a position at which said circuitry is energized and said visual indicator blinks;

h. said power supply contained within a power supply compartment of said case, and said tamper sensor detecting unauthorized tampering with the power supply compartment and triggering said auditory alarm;

i. said motion sensor detecting unauthorized movement of said cycle or said combination alarm and locking apparatus and triggering said auditory alarm; and j. said cable continuity sensor detecting unauthorized cutting or disconnecting of said cable lock and triggering said auditory alarm;

k. whereby when said combination alarm and locking apparatus is detachably mounted to said cycle and includes both said U-bolt lock and said cable lock for locking said cycle, it can provide multi-mode alarm protection including motion detection, power compartment tamper detection and cable lock continuity detection, all operable with said single key.

2. The invention in accordance with claim 1 wherein said auditory alarm is a piezoelectric sound transducer.

3. The invention in accordance with claim 1 wherein said visual alarm is a light emitting diode (LED).

4. The invention in accordance with claim 1 wherein said power supply is a direct current (DC) battery.

5. The invention in accordance with claim 1 wherein said motion sensor is a mercury switch motion sensor.

6. The invention in accordance with claim 1 wherein said two opposite lateral members made of resilient material and mounted on said case are snug snaps made of rubber type material.

7. The invention in accordance with claim 1 wherein said two opposite lateral members made of resilient material and mounted on said case are U-shaped receivers made of rubber type material.

8. A multi-mode combination alarm and locking apparatus for bicycles and motorcycles having a frame structure with a tubular section, the multi-mode combination alarm and locking apparatus comprising:

a. a hollow bracket which can be detachably mounted to said tubular section of said frame structure of a cycle;

b. a case slidably mounted to said bracket from outside of the case, the case being locked to said bracket but completely separable from said bracket even as said bracket remains attached to said tubular section of said frame structure;

c. a U-bolt lock including a base rod which is rotatably retained by said case and a U-shaped yoke locked to the base rod;

d. a cable lock having an elongated flexible cable with a conductive core and retained by a retractable spool which is releasibly engaged with means for controlling the retraction of the spool;

e. a key switch, a power supply, a motion sensor, a tamper sensor, a cable continuity sensor, an auditory alarm and a visual indicator, all retained by said case and electrically connected to an electronic circuitry located within said case;

f. said key switch being switched from outside of said case by a single key for locking or unlocking said U-bolt lock, locking or unlocking said cable lock, locking or unlocking said case with said bracket, and for switching on said circuitry and said visual indicator;

g. said power supply contained within a power supply compartment of said case, and said tamper sensor detecting unauthorized tampering with the power supply compartment and triggering said auditory alarm;

h. said motion sensor detecting unauthorized movement of said cycle or said combination alarm and locking apparatus and triggering said auditory alarm; and i. said cable continuity sensor detecting unauthorized cutting or disconnecting of said cable lock and triggering said auditory alarm;

j. whereby when said combination alarm and locking apparatus is be detachably mounted to said cycle and includes both said U-bolt lock and said cable lock for locking said cycle, it can provide multi-mode alarm protection including motion detection, power compartment tamper detection and cable lock continuity detection, all operable with said single key.

9. The invention in accordance with claim 8 wherein said auditory alarm is a piezoelectric sound transducer.

10. The invention in accordance with claim 8 wherein said visual alarm is a light emitting diode (LED).

11. The invention in accordance with claim 8 wherein said power supply is a direct current (DC) battery.

12. The invention in accordance with claim 8 wherein said motion sensor is a mercury switch motion sensor.

13. A multi-mode combination alarm and locking apparatus for bicycles and motorcycles, comprising:

a. a bracket detachably attached to said frame structure of a cycle;

b. a case slidably attached to said bracket from outside of the case, the case being completely separable from said bracket even as said bracket remains attached to said frame structure;

c. a U-bolt lock including a base rod which is rotatably retained by said case and a U-shaped yoke locked to the base rod;

d. a cable lock having an elongated flexible cable wound on a retractable spool which is releasibly engaged with means for controlling the retraction of the spool;

e. a key switch, a power supply, a tamper sensor and an auditory alarm all retained by said case and electrically connected to an electronic circuitry located within said case;

f. said key switch being switched from outside of said case by a single key for locking or unlocking said U-bolt lock, locking or unlocking said cable lock, locking or unlocking said case with said bracket, and for switching on said circuitry; and g. said power supply contained within a power supply compartment of said case, and said tamper sensor detecting unauthorized tampering with the power supply compartment and triggering said auditory alarm;

h. whereby when said combination alarm and locking apparatus is be detachably mounted to said cycle and includes both said U-bolt lock and said cable lock for locking said cycle, it also provides alarm protection including power compartment tamper detection, all operable with said single key.

14. The invention in accordance with claim 13 further comprising a motion sensor for detecting Unauthorized movement of said cycle or said combination alarm and locking apparatus and triggering said auditory alarm.

15. The invention in accordance with claim 14 wherein said motion sensor is a mercury switch motion sensor.

16. The invention in accordance with claim 13 further comprising a cable continuity sensor detecting unauthorized cutting or disconnecting of said cable lock and triggering said auditory alarm.

17. The invention in accordance with claim 13 further comprising a visual indicator which blinks when said circuitry is energized.

18. A multi-mode combination alarm and locking apparatus for bicycles and motorcycles, comprising:

a. a case slidably attached to a bracket from outside of the case, said bracket is detachably attached to a cycle, the case being completely separable from said bracket even as said bracket remains attached to said tubular section of said frame structure;

b. a U-bolt lock retained by said case;

c. a cable lock retained by said case;

d. a key switch, a power supply, a motion sensor, a cable continuity sensor, and an auditory alarm all retained by said case and electrically connected to an electronic circuitry located within said case;

e. said key switch being switched from outside of said case by a single key for locking or unlocking said U-bolt lock, locking or unlocking said cable lock, and for switching on said circuitry;

f. said motion sensor detecting unauthorized movement of said cycle or said combination alarm and locking apparatus and triggering said auditory alarm; and g. said cable continuity sensor detecting unauthorized cutting or disconnecting of said cable lock and triggering said auditory alarm;

h. whereby when said combination alarm and locking apparatus is detachably mounted to said cycle and includes both said U-bolt lock and said cable lock for locking said cycle, it also provides alarm protection including motion detection and cable continuity detection, all operable with said single key.

19. The invention in accordance with claim 18 wherein said case is attached to said cycle through a hollow bracket which can be detachably mounted to a tubular section of the frame structure of said cycle.

20. The invention in accordance with claim 18 wherein said motion sensor is a mercury switch motion sensor.

21. The invention in accordance with claim 18 further comprising a power supply tamper sensor for detecting unauthorized tampering with said power supply and triggering said auditory alarm.

22. The invention in accordance with claim 18 further comprising a visual indicator which blinks when said circuitry is energized.

23. A multi-mode combination alarm and locking apparatus used in conjunction with a U-bolt lock which has a base rod and a U-shaped yoke locked to the base rod, for protecting bicycles and motorcycles having a frame structure with a tubular section, the multi-mode combination alarm and locking apparatus comprising:

a. a hollow tubular bracket mounted to said tubular section of said frame structure of a cycle, the bracket including two separable halves and means for securing the two halves once they embrace the tubular section;

b. a case slidably engaged with said bracket from outside of the case, said bracket connects the case to the cycle, the case completely separable from said bracket even as said bracket remains attached to said tubular section of said frame structure, the case when fully engaged shielding said securing means on said bracket and being locked to said bracket;

c. said case having a smooth through bore for rotatably retaining said base rod of said U-bolt, and two opposite lateral members made of resilient material for snug engagement with said U-shaped yoke of said U-bolt;

d. a cable lock including an elongated flexible cable which has a conductive core, the cable being wound on a retractable spool and extendable to outside of said case;

e. said spool being biased by a coil spring and engaged with a rachet mechanism which controls the retraction of said spring, the rachet mechanism being released by means accessible from outside of said case;

f. said case further retaining a key switch, a power supply, a motion sensor, a tamper sensor, a cable continuity sensor, an auditory alarm and a visual indicator, all electrically connected with an electronic circuitry contained within said case;

g. said key switch being switched from outside of said case by a single key for locking or unlocking said cable lock, and locking or unlocking said case with said bracket, and being switched to a position at which said circuitry is energized and said visual indicator blinks;

h. said power supply contained within a power supply compartment of said case, and said tamper sensor detecting unauthorized tampering with the power supply compartment and triggering said auditory alarm;

i. said motion sensor detecting unauthorized movement of said cycle or said combination alarm and locking apparatus and triggering said auditory alarm; and j. said cable continuity sensor detecting unauthorized cutting or disconnecting of said cable lock and triggering said auditory alarm;

k. whereby when said combination alarm and locking apparatus is detachably mounted to said cycle and used together with said U-bolt lock, and further provides said cable lock for locking said cycle, it can provide multi-mode alarm protection including motion detection, power compartment tamper detection and cable lock continuity detection, all operable with said single key.

24. The invention in accordance with claim 23 wherein said auditory alarm is a piezoelectric sound transducer.

25. The invention in accordance with claim 23 wherein said visual alarm is a light emitting diode (LED).

26. The invention in accordance with claim 23 wherein said power supply is a direct current (DC) battery.

27. The invention in accordance with claim 23 wherein said motion sensor is a mercury switch motion sensor.

28. The invention in accordance with claim 23 wherein said two opposite lateral members made of resilient material and mounted on said case are snug snaps made of rubber type material.

29. The invention in accordance with claim 23 wherein said two opposite lateral members made of resilient material and mounted on said case are U-shaped receivers made of rubber type material.

30. A multi-mode combination alarm and locking apparatus used in conjunction with a U-bolt lock which has a base rod and a U-shaped yoke for protecting bicycles and motorcycles, the multi-mode combination alarm and locking apparatus comprising:
   a. a case slidably attached to a bracket from outside of the case, said bracket is detachably attached to a cycle, the case being completely separable from said bracket even as said bracket remains attached to said tubular section of said frame structure;
   b. said case having a through bore for rotatably retaining said base rod of said U-bolt such that when said U-bolt is locked, said case is locked with said U-bolt lock;
   c. a cable lock retained by said case;
   d. a key switch, a power supply, a motion sensor, a cable continuity sensor, and an auditory alarm all retained by said case and electrically connected to an electronic circuitry located within said case;
   e. said key switch being switched from outside of said case by a single key for locking or unlocking said cable lock, and for switching on said circuitry;
   f. said motion sensor detecting unauthorized movement of said cycle or said combination alarm and locking apparatus and triggering said auditory alarm; and
   g. said cable continuity sensor detecting unauthorized cutting or disconnecting of said cable lock and triggering said auditory alarm;
   h. whereby when said combination alarm and locking apparatus is detachably mounted to said cycle and used together with said U-bolt lock, and further has said cable lock for locking said cycle, it can provide multi-mode alarm protection including motion detection, power compartment tamper detection and cable lock continuity detection, all operable with said single key.

31. The invention in accordance with claim 30 wherein said case is attached to said cycle through a hollow bracket which can be detachably mounted to a tubular section of the frame structure of said cycle.

32. The invention in accordance with claim 30 wherein said motion sensor is a mercury switch motion sensor.

33. The invention in accordance with claim 30 further comprising a power supply tamper sensor for detecting unauthorized tampering with said power supply and triggering said auditory alarm.

34. The invention in accordance with claim 30 further comprising a visual indicator which blinks when said circuitry is energized.

35. A multi-mode combination alarm and locking apparatus for bicycles and motorcycles having a frame structure with a tubular section, the multi-mode combination alarm and locking apparatus comprising:
   a. a bracket mounted to said tubular section of said frame structure of a cycle, the bracket including two flexible upper straps and a rigid lower half block, where the rigid lower half block has a lengthwise groove for accommodating said tubular section, and the two flexible upper straps can be releasibly fastened around said tubular section and to the lower half block by securing means;
   b. a case slidably engaged with said lower half block of said bracket from outside of the case, said bracket connects the case to the cycle, the case completely separable from said bracket even as said bracket remains attached to said tubular section of said frame structure, the case when fully engaged shielding said securing means on said bracket and being lockable to said bracket;
   c. a U-bolt lock including a base rod and a U-shaped yoke locked to the base rod, the base rod rotatably retained in a through bore of said case, and the U-shaped yoke for snug engagement with two opposite lateral members made of resilient material and mounted on said case;
   d. a cable lock including an elongated flexible cable which has a conductive core, the cable being wound on a retractable spool and extendable to outside of said case;
   e. said spool being biased by a coil spring and engaged with a rachet mechanism which controls the retraction of said spring, the rachet mechanism being released by means accessible from outside of said case;
   f. said case further retaining a key switch, a power supply, a motion sensor, a tamper sensor, a cable continuity sensor, an auditory alarm and a visual indicator, all electrically connected with an electronic circuitry contained within said case;
   g. said key switch being switched from outside of said case by a single key for locking or unlocking said U-bolt lock, locking or unlocking said cable lock, and locking or unlocking said case with said bracket, and being switched to a position at which said circuitry is energized and said visual indicator blinks;
   h. said power supply contained within a power supply compartment of said case, and said tamper sensor detecting unauthorized tampering with the power supply compartment and triggering said auditory alarm;
   i. said motion sensor detecting unauthorized movement of said cycle or said combination alarm and locking apparatus and triggering said auditory alarm; and j. said cable continuity sensor detecting unauthorized cutting or disconnecting of said cable lock and triggering said auditory alarm;

k. whereby when said combination alarm and locking apparatus is detachably mounted to said cycle and includes both said U-bolt lock and said cable lock for locking said cycle, it can provide multi-mode alarm protection including motion detection, power compartment tamper detection and cable lock continuity detection, all operable with said single key.

36. The invention in accordance with claim 35 wherein said two opposite lateral members made of resilient material and mounted on said case are snug snaps made of rubber type material.

37. The invention in accordance with claim 35 wherein said two opposite lateral members made of resilient material and mounted on said case are U-shaped receivers made of rubber type material.

38. A multi-mode combination alarm and locking apparatus used in conjunction with a U-bolt lock which has a base rod and a U-shaped yoke locked to the base rod, for protecting bicycles and motorcycles having a frame structure with a tubular section, the multi-mode combination alarm and locking apparatus comprising:

a. a bracket mounted to said tubular section of said frame structure of a cycle, the bracket including two flexible upper straps and a rigid lower half block, where the rigid lower half block has a lengthwise groove for accommodating said tubular section, and the two flexible upper straps can be releasibly fastened around said tubular section and to the lower hag block by securing means;

b. a case slidably engaged with said lower half block of said bracket from outside of the case, said bracket connects the case to the cycle, the case completely separable from said bracket even as said bracket remains attached to said tubular section of said frame structure, the case when fully engaged shielding said securing means on said bracket and being lockable to said bracket;

c. said case having a smooth through bore for rotatably retaining said base rod of said U-bolt, and two opposite lateral members made of resilient material for snug engagement with said U-shaped yoke of said U-bolt;

d. a cable lock including an elongated flexible cable which has a conductive core, the cable being wound on a retractable spool and extendable to outside of said case;

e. said spool being biased by a coil spring and engaged with a rachet mechanism which controls the retraction of said spring, the rachet mechanism being released by means accessible from outside of said case;

f. said case further retaining a key switch, a power supply, a motion sensor, a tamper sensor, a cable continuity sensor, an auditory alarm and a visual indicator, all electrically connected with an electronic circuitry contained within said case;

g. said key switch being switched from outside of said case by a single key for locking or unlocking said cable lock, and locking or unlocking said case with said bracket, and being switched to a position at which said circuitry is energized and said visual indicator blinks;

h. said power supply contained within a power supply compartment of said case, and, said tamper sensor detecting unauthorized tampering with the power supply compartment and triggering said auditory alarm;

i. said motion sensor detecting unauthorized movement of said cycle or said combination alarm and locking apparatus and triggering said auditory alarm; and j. said cable continuity sensor detecting unauthorized cutting or disconnecting of said cable lock and triggering said auditory alarm;

k. whereby when said combination alarm and locking apparatus is detachably mounted to said cycle and used together with said U-bolt lock, and further provides said cable lock for locking said cycle, it can provide multi-mode alarm protection including motion detection, power compartment tamper detection and cable lock continuity detection, all operable with said single key.

39. The invention in accordance with claim 37 wherein said two opposite lateral members made of resilient material and mounted on said case are snug snaps made of rubber type material.

40. The invention in accordance with claim 37 wherein said two opposite lateral members made of resilient material and mounted on said case are U-shaped receivers made of rubber type material.

41. A multi-mode combination alarm and locking apparatus for bicycles and motorcycles, comprising a case slidably attached to a separate bracket from outside of the case, said bracket is detachably attached to a cycle, where the case is completely separable from said bracket even as said bracket remains attached to said cycle, a U-bolt lock having a base rod rotatably retained in a through bore of the case and a U-shaped yoke locked to the base rod, and an electronic alarm for detecting unauthorized movement of the cycle or the case and providing an auditory siren thereupon.

42. The invention in accordance with claim 41 further comprising a bracket which can be detachably mounted to a tubular section of the frame structure of said cycle, such that said case can be attached to said cycle through the bracket.

43. The invention in accordance with claim 41 further comprising an exclusive key switch, which is switchable from outside of said case by a single key, for locking or unlocking said U-bolt lock and switching on or off said electronic alarm.

44. The invention in accordance with claim 41 further comprising a visual indicator which blinks when said electronic alarm is energized.

45. The invention in accordance with claim 41 further comprising two opposite lateral members made of resilient material and mounted on said case for accommodating said U-bolt lock.

46. The invention in accordance with claim 41 wherein said electronic alarm incorporates a motion sensor for detecting unauthorized movement of said cycle or said case and triggering said auditory siren.

47. The invention in accordance with claim 41 further comprising a power supply disposed inside said case for energizing said electronic alarm.

48. The invention in accordance with claim 47 wherein said electronic alarm further incorporates a power tamper sensor for detecting unauthorized tampering with said power supply and triggering said auditory siren.

49. The invention in accordance with claim 41 further comprising a retractable cable lock.

50. The invention in accordance with claim 49 wherein said electronic alarm further incorporates a cable continuity sensor for detecting unauthorized tampering of said retractable cable lock and triggering said auditory siren.

51. A multi-mode combination alarm and locking apparatus for bicycles and motorcycles, comprising a case slidably attached to a separate bracket from outside of the case, detachably attached to a cycle, where the case is completely separable from said bracket even as said bracket remains attached to said cycle, a U-bolt lock having a base rod rotatably retained in a through bore of the case and a U-shaped yoke locked to the base rod, a retractable cable lock, and an electronic alarm for detecting unauthorized movement of the cycle or the case or tampering of the retractable cable lock and providing an auditory siren thereupon.

52. The invention in accordance with claim 51 further comprising a bracket which can be detachably mounted to a tubular section of the frame structure of said cycle, such that said case can be attached to said cycle through the bracket.

53. The invention in accordance with claim 51 further comprising an exclusive key switch, which is switchable from outside of said case by a single key, for locking or unlocking said U-bolt lock and said retractable cable lock, and switching on or off said electronic alarm.

54. The invention in accordance with claim 51 further comprising two opposite lateral members made of resilient material and mounted on said case, such that said U-shaped yoke of said U-bolt lock can be engaged therewith.

55. The invention in accordance with claim 51 wherein said retractable cable lock includes an elongated flexible cable wound on a retractable spool and extendable to outside of said case.

56. The invention in accordance with claim 55 wherein said spool is biased by a coil spring and engaged with an one-way rachet mechanism, which controls the retraction of said spool can be releasible by pressing a release button which is accessible from outside of said case.

57. The invention in accordance with claim 51 wherein said electronic alarm incorporates a motion sensor for detecting unauthorized movement of said cycle or said case and triggering said auditory siren.

58. The invention in accordance with claim 51 wherein said electronic alarm further incorporates a cable continuity sensor for detecting unauthorized tampering of said retractable cable lock and triggering said auditory siren.

59. The invention in accordance with claim 51 further comprising a power supply disposed inside said case for energizing said electronic alarm.

60. The invention in accordance with claim 59 wherein said electronic alarm further incorporates a power tamper sensor for detecting unauthorized tampering with said power supply and triggering said auditory siren.

* * * * *